(12) United States Patent
Walker et al.

(10) Patent No.: US 11,313,648 B2
(45) Date of Patent: Apr. 26, 2022

(54) TELESCOPIC SIGHT

(71) Applicant: DEBEN GROUP INDUSTRIES LIMITED, Woodbridge (GB)

(72) Inventors: Stephen Andrew Walker, Ipswich (GB); Alexander George Jenkinson, Woodbridge (GB)

(73) Assignee: Hawke Optics Limited, Woodbridge (GB)

( * ) Notice: Subject to any disclaimer, the term of this patent is extended or adjusted under 35 U.S.C. 154(b) by 414 days.

(21) Appl. No.: 16/346,732

(22) PCT Filed: Nov. 22, 2017

(86) PCT No.: PCT/IB2017/057345
§ 371 (c)(1),
(2) Date: May 1, 2019

(87) PCT Pub. No.: WO2018/096475
PCT Pub. Date: May 31, 2018

(65) Prior Publication Data
US 2020/0056859 A1     Feb. 20, 2020

(30) Foreign Application Priority Data

Nov. 22, 2016  (GB) ...................... 1619743

(51) Int. Cl.
*F41G 1/38*     (2006.01)
*G02B 7/10*     (2021.01)
(Continued)

(52) U.S. Cl.
CPC ................. *F41G 1/38* (2013.01); *G02B 7/02* (2013.01); *G02B 7/10* (2013.01); *G02B 7/16* (2013.01); *G02B 23/16* (2013.01); *G02B 23/14* (2013.01)

(58) Field of Classification Search
CPC ... G02B 7/00; G02B 7/02; G02B 7/04; G02B 7/021; G02B 7/023; G02B 7/026;
(Continued)

(56) References Cited

U.S. PATENT DOCUMENTS 3,058,391 A    10/1962   Leupold
5,181,323 A     1/1993   Cooper
(Continued)

FOREIGN PATENT DOCUMENTS

CN         1873363 A    12/2006
CN       201096972 Y     8/2008
(Continued)

OTHER PUBLICATIONS

International Search Report and Written Opinion of the International Searching Authority (PCT/IB2017/057345) dated Mar. 16, 2018, 15 pages.
(Continued)

*Primary Examiner* — Jie Lei
(74) *Attorney, Agent, or Firm* — Burr & Brown, PLLC

(57) ABSTRACT

A telescopic sight for a hand-held weapon comprises a housing for an optical system that presents a telescopic image to a user, and a zoom adjustment ring on the housing. The optical system has objective and ocular lens systems and between these an image erector lens system, and a sighting element bearing a graphic image pattern at either a first focal plane between the image erector lens system and the objective lens system or a second focal plane between the image erector lens system and the ocular lens system. An optical zoom system is linked to the zoom adjustment ring for effecting a change in magnification. The zoom adjustment ring is movable over the housing in opposite forward and rearward axial directions between a locked position and an unlocked position to adjust the zoom magnification. In
(Continued)

the locked position interengaging formations between the ring and housing slides into engagement.

24 Claims, 12 Drawing Sheets

(51) Int. Cl.
*G02B 7/02* (2021.01)
*G02B 7/16* (2021.01)
*G02B 23/16* (2006.01)
*G02B 23/14* (2006.01)

(58) Field of Classification Search
CPC . G02B 7/10; G02B 7/16; G02B 23/00; G02B 23/16; G02B 23/14; G02B 23/145; F41G 1/38; F41G 1/42; F41G 1/467
USPC ....... 359/362, 399, 400, 405, 411, 412, 414, 359/415, 416, 418, 420, 422; 42/119, 42/120, 124, 125
See application file for complete search history.

(56) References Cited

U.S. PATENT DOCUMENTS

| 5,528,847 | A | 6/1996 | Fisher et al. |
| 7,944,611 | B1 | 5/2011 | Regan et al. |
| 2006/0262391 | A1* | 11/2006 | Thomas ................... G02B 7/10 |
| | | | 359/422 |
| 2011/0261449 | A1 | 10/2011 | Schmitt |

FOREIGN PATENT DOCUMENTS

| CN | 204705266 U | 10/2015 |
| CN | 205300392 U | 6/2016 |
| CN | 205425978 U | 8/2016 |
| CN | 206593534 U | 10/2017 |

OTHER PUBLICATIONS

International Preliminary Report on Patentability (PCT/IB2017/057345) dated Nov. 9, 2018, 25 pages.
GB Search Report (GB 1619743.6) dated Jul. 25, 2017, 5 pages.
Chinese Office Action (Application No. 201780071731.7) dated Dec. 14, 2020.
English translation of Chinese Office Action (Application No. 201780071731.7) dated Dec. 14, 2020.

* cited by examiner

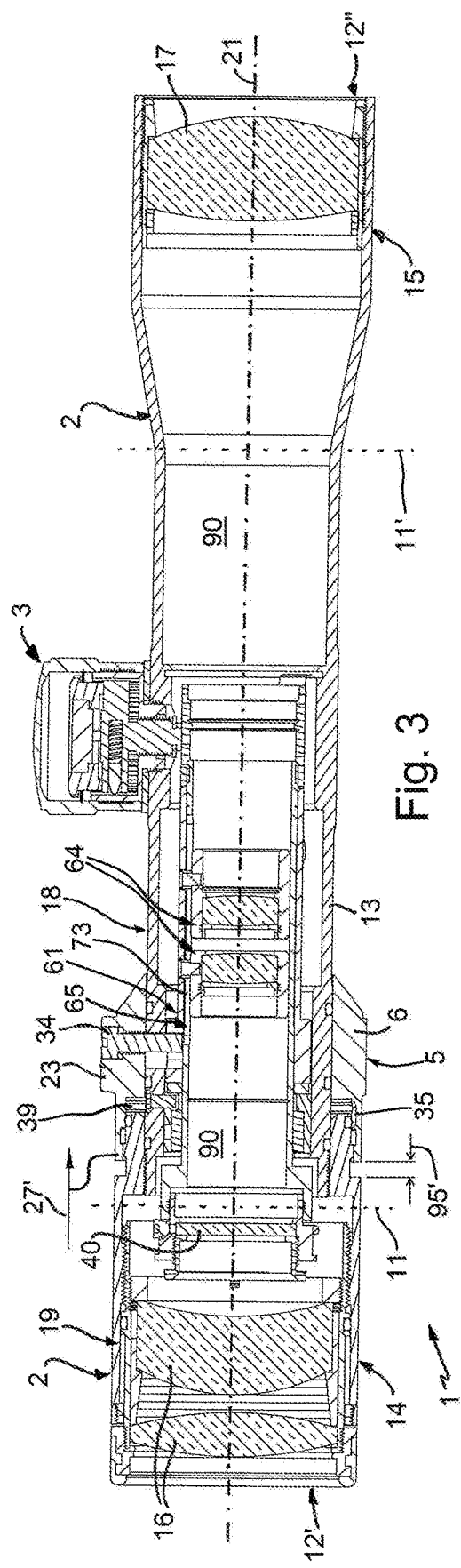
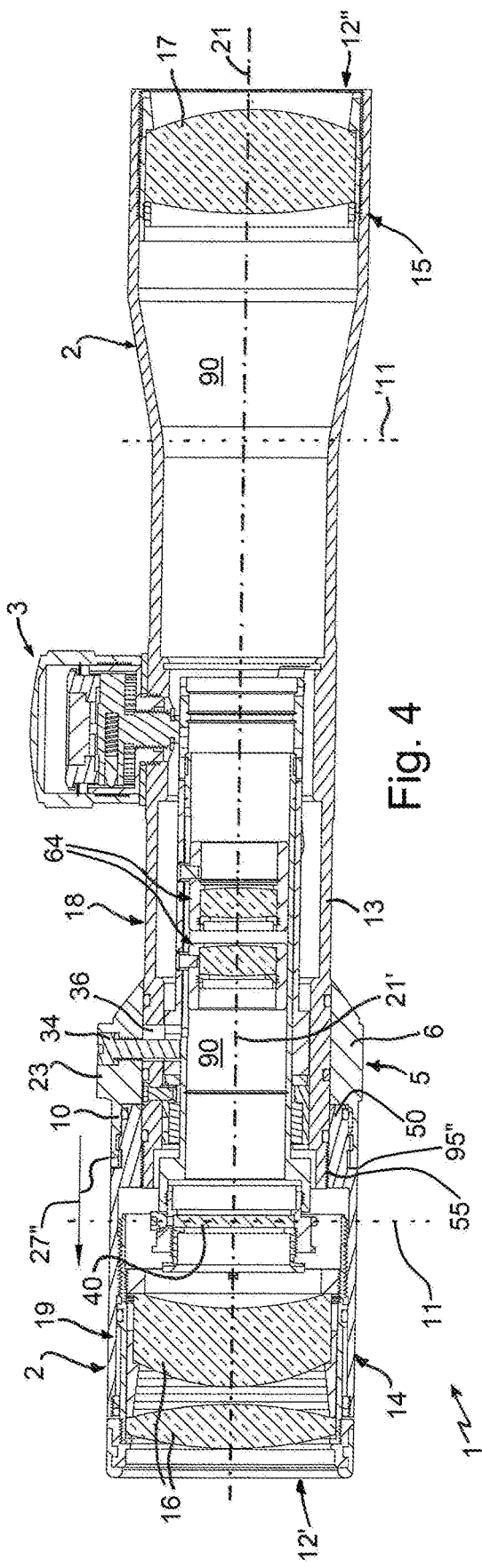
Fig. 3
Fig. 4

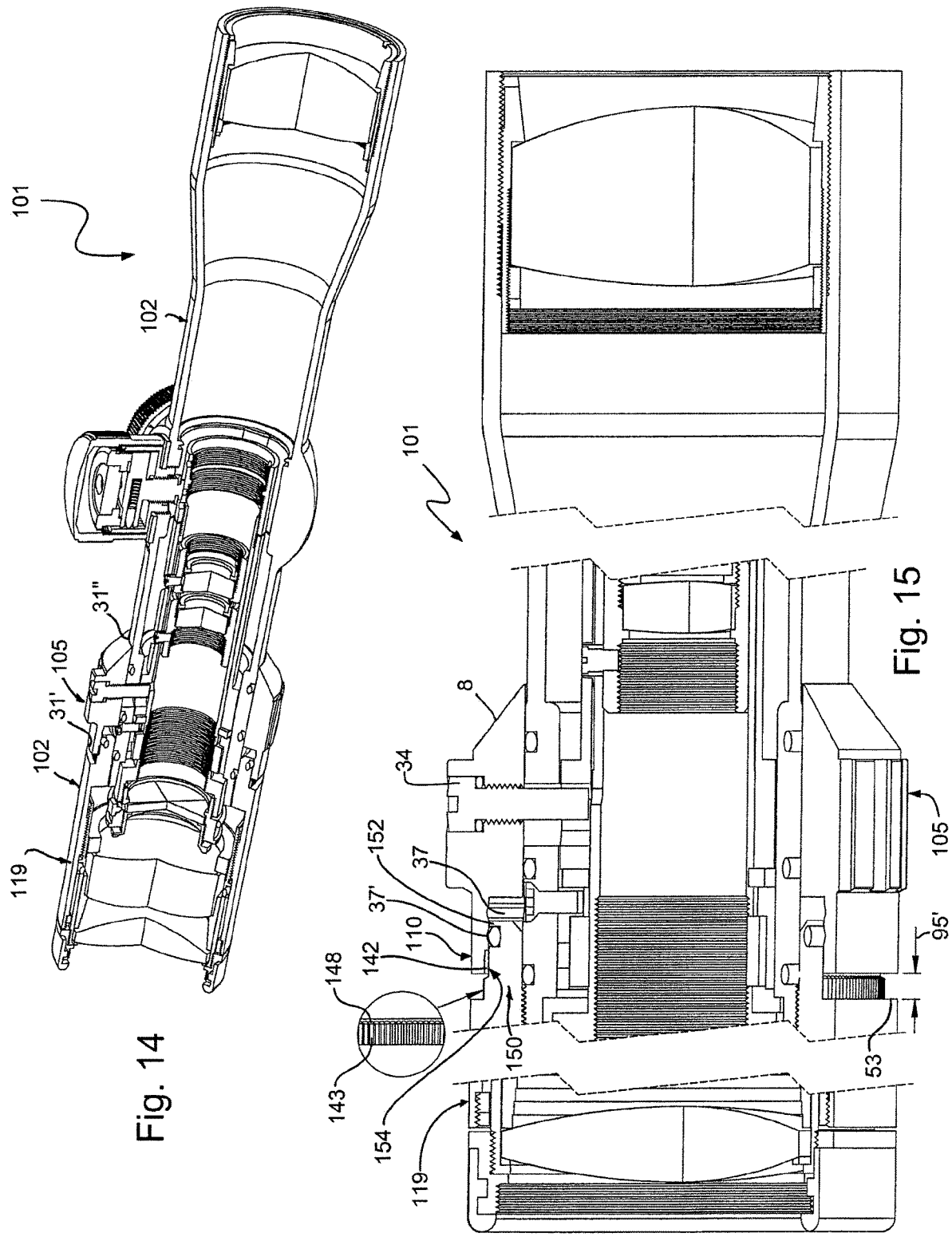

TELESCOPIC SIGHT

BACKGROUND a. Field of the Invention

The present invention relates to a telescopic sight for a crossbow, rifle or any other type of hand-held weapon, the telescopic sight comprising a manually adjustable zoom mechanism for setting the magnification of an optical zoom system.

b. Related Art

A telescopic sight, commonly called a scope, for a crossbow or a rifle typically has a tubular external housing and a pair of manually adjustable sighting mechanisms including a sighting manual adjustment control mounted on the housing, one for adjusting windage and the other for adjusting elevation. A scope will have an optical system housed by the housing, including opposite objective and ocular (or "eyepiece") lenses and in between these lenses within the housing a sighting element bearing a graphic image pattern that is optically arranged with respect to the objective and ocular lenses, such that the graphic image pattern provides the aiming point in a telescopic image generated by the objective and ocular lenses. Manual adjustment of the sighting mechanisms then moves the graphic image relative to the telescopic image.

Each of the objective and ocular lenses may either be a single lens, for example an aspheric lens, or may be a compound lens system made up of multiple lens elements, and for convenience both possibilities will be referred to hereinafter in the singular as a "lens system". The ratio of the focal length of the ocular lens system divided into the focal length of the objective lens system gives the linear magnification factor of the scope. A magnification factor of 10 will generate a telescopic image equivalent to being 10 times closer to the object. A lower magnification factor provides an image that is less susceptible to shaking. A higher magnification factor provides a smaller field of view.

To cover a range of magnification factors, scopes may also include a manually adjustable zoom mechanism for setting the magnification of an optical zoom system. The manually adjustable zoom mechanism will include a manual zoom adjustment control mounted on the housing separately from the sighting mechanisms. When the zoom mechanism is manually adjusted, the magnification of the telescopic image is increased or decreased.

There are many different types of known sighting elements, but the most common type is a reticle, of which there are two types: wire reticles and etched reticles. Wire reticles are made out of metal wire or thread and are mounted in an optically appropriate position inside the housing. Etched reticles have the desired reticle layout etched on one surface an optic element, usually a plain disc or a lens made from a clear glass or plastic material, which is then mounted within the housing as an integrated part of the optical arrangement. The centre of the reticle pattern, for example a crosshairs, has one aiming point, and usually the rifle or crossbow will be sighted or zeroed in on this aiming point for a set distance to target. The reticle pattern will often have one or more aiming points directly above and below the central aiming point, each aiming point corresponding to steps of a set number of yards or metres, for example either 100 yards for rifle shooting or 10 yards for crossbow shooting, in front of or behind the set distance to target for which the scope was zeroed.

Graphic image patterns therefore often also include marks or lines that are used for stadiametric range finding. By using a reticle with marks of a known angular spacing to find either the distance to objects of known size or the size of objects at a known distance. Once the distance to the target has been estimated, an aiming point in the reticle pattern can be chosen.

The optical system between the objective and eyepiece lens systems will include an image erector lens system so that the eyepiece image is correctly oriented and not inverted. Therefore, there are normally two focal planes inside the housing along an optical axis defined by the objective and eyepiece lens systems, a front, or first, focal plane (FFP) and a rear, or second focal plane (SFP), and the sighting element may be located at either of these focal planes. On fixed power telescopic sights there is no significant difference between these two options, but on variable power telescopic sights there is a fundamental difference. With the sighting element placed at the FFP location, the graphic image pattern of the reticle remains at a constant size as compared with the target image, which therefore both grow and shrink as the telescopic control is used to vary the zoom. On the other hand, if the reticle is placed at the SFP location, the graphic image pattern of the sighting element will appear as a constant size in the telescopic image presented to the user while the telescopic target image will grow and shrink as the telescopic control is used to vary the zoom.

FFP scopes are particularly useful when shooting at varying ranges, as the stadia pattern will remain in the same place on the target as magnification is changed. However, in a SFP scope, only the crosshairs, i.e. the centre of the reticle pattern, will remain in the same position. On the other hand, one potential problem in an FFP scope is that the reticle pattern is magnified at a high magnification factor, with the result that a reticle feature, for example an aiming spot, may become so large as to cover or obscure the target area. For a variety of reasons, FFP scopes are also much more expensive compared to SFP models of similar quality.

Telescopic sights are sometimes equipped with a parallax compensation mechanism which essentially consists of a movable optical element that enables the optical system to project a telescopic image of objects at varying distances and the graphic image together in exactly the same optical plane. There are two common ways of providing parallax compensation, either by making the objective lens system of the telescopic sight adjustable or by making an internal lens system in the internal optical groups mounted somewhere in front of the reticle plane adjustable so the telescopic sight can compensate parallax errors. The invention is applicable to scopes without parallax compensation as well as to both of these types of parallax compensation.

Rifle ammunition has highly uniform characteristics, and so the muzzle velocity of a bullet is highly repeatable. The markings on reticles for use with a rifle scope can therefore be tailored to the characteristics of a particular type of ammunition.

The velocity of a bolt from a crossbow is much lower than that of a bullet, and the speed will vary depending on the type of crossbow and weight, type and quality of the bolts, which are intended to be re-usable. A typical reticle for use with a crossbow is provided with aim points between 20 to 100 yards (or metres) with 10 yard (or metre) intervals. If a crossbow reticle has aiming points calibrated for one speed then this will be inconvenient to use for another speed, as the shooter would have to memorise and then in use apply a conversion factor to know the correct aiming point. Changing a reticle for a different reticle is inconvenient, because the reticle is within an atmospherically sealed interior of the scope housing.

Crossbow sights have therefore been developed of the SFP type and with telescopic zoom. The manual adjustment control of the zoom mechanism is an annular ring near the ocular housing, which has a scale marked in feet per second or metres per second. As the zoom adjustment ring is turned, the magnification of the image, but not that of the reticle pattern, changes with the result that the aiming points can be correctly sighted for different bolt velocities. The sighting procedure typically involves mounting the crossbow in a fixed orientation either 10 or 20 yards (or metres) away from a sighting target, firing a grouping of bolts and then zeroing these using the horizontal and vertical manual adjustment controls so that the crosshairs (or alternatively a different 10 or 20 yard (or metre) aiming point) are correctly sighted with the next grouping.

Then the crossbow (or the target) is moved to increase the distance to, for example, 30, 40 or 50 yards (or metres) and another grouping of bolts is fired. This time, the horizontal and vertical manual adjustment controls are not adjusted, and the zoom adjustment ring is turned as necessary until a subsequent grouping falls on the target at the aiming point for that distance. In this way, the aiming points are brought into correspondence with the bolt trajectory for a particular bolt firing velocity. Because the zoom adjustment ring is used primarily to zero the crossbow sight for bolt speed, rather than to change the size of the image, the zoom adjustment ring on such a crossbow is often called a "speed ring".

The crossbow and scope may then be used. To maintain the zoom or speed ring at the correct setting, such rings often provide some resistance to being turned, but this does not stop the ring from being inadvertently turned by a knock or by external pressure. For future reference, it may be possible for the user to make a note of the zoom setting, if the speed scale is sufficiently gradated. Alternatively, the user could score a mark into the housing and/or ring to indicate the correct setting. This is far from satisfactory, and so it is common practice to use tape, for example electricians' PVC tape, wrapped around the housing and overlapping the ring, to secure the ring at the correct setting.

It is an object of the present invention to provide a telescopic sight comprising an optical zoom system, for a hand-held weapon, for example a crossbow, rifle, handgun or other similar weapon which addresses these issues.

SUMMARY OF THE INVENTION

According to the invention, there is provided a telescopic sight for a hand-held weapon, comprising:
  an optical system configured to present a telescopic image to a user of the telescopic sight, said telescopic image comprising a target image and a graphic image pattern that provides to the user an aiming point in the target image, the optical system comprising an optical zoom system configured to increase and decrease a magnification of said target image;
  a housing, the optical system being housed by the housing and the housing extending around an optical axis of the optical system and extending forwards from an ocular bell of the housing towards an objective portion of the housing and comprising between said ocular bell and objective portion a housing main body; and
  a zoom adjustment ring mounted on the housing main body forwards of the ocular bell of the housing, the zoom adjustment ring comprising a main band extending around a circumference of the housing main body;
  the main band of the zoom adjustment ring is slideably mounted with respect to the housing whereby the zoom adjustment ring is configured to rotate in opposite first and second circumferential directions; and
  the main band of the zoom adjustment ring is linked to the optical zoom system to permit manual adjusting of said magnification of said target image when the zoom adjustment ring is rotated;
  wherein:
  the ocular bell comprises an outer surface and at a forward end of said outer surface a circumferentially extending shoulder that extends radially inwards from said outer surface, said ocular bell further comprising forwards of said a radially outwards facing surface of reduced outer diameter relative to that of said outer surface of the ocular bell;
  the main band of the zoom adjustment ring is slideably mounted with respect to the housing whereby the zoom adjustment ring is configured to slide axially between a first axial position and a second axial position;
  the zoom adjustment ring further comprises a rearward portion extending from the main band towards the ocular bell, the rearward portion comprising a radially inwards facing surface configured to oppose and side axially over said radially outwards facing surface as the zoom adjustment ring is moved axially between said first and second positions;
  interengaging formations are provided on said opposing radially outwards facing surface and radially inwards facing surface, said formations sliding into engagement with each other when the zoom adjustment ring is axially moved to one of the first and second axial positions, thereby locking the ring against circumferential rotation to set the magnification of said target image, and sliding out of engagement with each other when the zoom adjustment ring is axially moved to the other of said first and second axial positions, thereby freeing the zoom adjustment ring for circumferential rotation to permit said manual adjusting of said magnification of said target image; and
  the rearward portion of the zoom adjustment ring is separated by an annular gap from said shoulder when the zoom adjustment ring is at said second axial position, said gap being closed when the zoom adjustment ring is at said first axial position.

The hand-held weapon may be any type of weapon firing a projectile, for example a rifle, a handgun, or a cross-bow. The weapon is hand-held in the sense of being capable of being hand-held in use. The weapon need not, however, be held by hand in use, and may be used in a different manner, for example being bench-mounted in use.

In general, the optical system will further comprise: an objective lens system; an ocular lens system; an image erector lens system between said objective and ocular lens systems; and a sighting element bearing a graphic image pattern that is optically arranged with respect to the objective and ocular lens systems to provide the aiming point in the target image.

Such an optical system conventionally provides a first focal plane between the image erector lens system and the objective lens system, and a second focal plane between the image erector lens system and the ocular lens system. In principle, the sighting element may be located at either the first focal plane or the second focal plane. In preferred embodiments of the invention, the sighting element is located at the second focal plane. In this case, the graphic image pattern of the sighting element has a substantially constant size in the telescopic image as the zoom adjustment ring is used to change the magnification of the target image.

The zoom adjustment ring is slideable over the housing as the ring is rotated in the first and second circumferential directions. Ideally, at least one O-ring under compression is provided in an interface between the ring and the housing to provide some resistance to manual rotation, so that once the zoom is set, this is maintained until the zoom adjustment ring is moved to the locked position.

The interface will in general be a cylindrical interface, which term includes both continuous and stepped cylindrical interfaces, comprising opposing surfaces that are substantially coaxial relative to a rotation axis of the zoom adjustment ring.

Preferably, the zoom adjustment ring is slideable over the housing as the ring is moved in the axial direction. Again, an O-ring under compression may be provided in an interface between the ring and the housing to provide some resistance to sliding in the axial direction, so that once locked or unlocked, the zoom adjustment ring remains in this state until deliberately moved by the user.

The interengaging formations may be intermeshing sets of teeth.

The interengaging formations may be teeth, arranged in two opposing sets, which slide in and out of interleaved engagement with each other.

The teeth preferably side axially into and out of engagement with each other as the zoom adjustment ring is moved in one or the other of the axial directions.

To provide smooth axial movement the teeth, with a minimum of radial motion as the teeth engage after the ring has been rotated to a desired zoom setting, the pitch of the teeth is preferably less than 2° in a circumferential direction.

In preferred embodiments of the invention, these intermeshing sets of teeth take the form of splines on each one of the zoom adjustment ring and the housing. Such splines are ridges or teeth on one part that mesh with grooves in the other part.

For example, the zoom adjustment ring may have one of the sets of teeth provided on a radially inward surface of the ring, and the housing may have another one of the sets of teeth provided on a radially outer surface of the housing. High points of each set of teeth may then interengage with low points on the other one of the sets of teeth when the zoom adjustment ring is moved to the locked position.

In preferred embodiments of the invention, each set of teeth is composed of a series of alternating ridges and grooves, the ridges and grooves extending in the axial direction and having in section a substantially zigzag surface profile. In this way, the ridges of each one of the sets of teeth interengage with the grooves of the other one of the sets when the zoom adjustment ring is moved to the locked position.

The ridges of each one of the sets of teeth may have tips that are rounded relative to the grooves of the other one of the sets of teeth with which the ridges interengage. This may be done so that the rounding provides clearance gaps to facilitate initial interengagement as the zoom adjustment ring is moved to the locked position.

The telescopic sight may further comprise an O-ring between said opposed radially outwards facing and inwards facing surfaces. The O-ring extends around the full circumference of the opposed surfaces and is axially located in a corresponding O-ring seat provided in a first one of the opposed surfaces. The O-ring is then axially slideable with respect to a second one of the opposed surfaces when the zoom adjustment ring is axially moved between said first and second positions.

Grease such as silicone grease may be applied to the O-ring to facilitate both sliding motion and an air seal across the O-ring.

The second one of the opposed surfaces may comprises a first groove, or notch and/or a second groove, or notch for locating the zoom adjustment ring in, respectively, the first axial position and/or the second axial position. The configuration of the opposed surfaces and the O-ring is such that radial compression of the O-ring is relaxed when the O-ring is located with, respectively, the first notch and/or the second notch, and increased when not located in, respectively, the first notch and/or the second notch. The O-ring is thereby retained in, respectively the first notch and/or the second notch. This locates the axial position of the zoom adjustment ring in, respectively, the first axial position and/or the second axial position.

Each groove or notch is preferably a circumferentially extending groove in the second one of the opposed surfaces.

The O-ring preferably contributes to an atmospheric seal of an interior of the housing.

The outer surface of the ocular bell may have, towards a forwards end of the bell, a circumferentially extending shoulder, that extends radially inwards from an outer surface of the ocular bell, for providing physical protection to the zoom adjustment ring, which is then provided immediately forward of the shoulder.

The shoulder may therefore be axially adjacent the zoom adjustment ring, so that the ring in one of the first and second positions abuts the shoulder and the ring in the other of the first and second positions is separated from the shoulder by an annular gap.

The shoulder may be between the zoom adjustment ring and the ocular end of the housing, in which case the zoom adjustment ring moves away from the ocular end of the housing when the zoom adjustment ring moves axially away from the shoulder.

When in the unlocked position, the zoom adjustment ring may be relatively nearer the ocular end of the housing than when in the locked position.

Alternatively, when in the unlocked position the zoom adjustment ring may be relatively nearer an objective end of the housing than the locked position of the zoom adjustment ring.

The optical zoom system is preferably linked to the zoom adjustment ring by a pin that extends radially inwards from the main band of the zoom adjustment ring. The housing main body may therefore have a slot therethrough to provide passage for the pin, the slot extending in a circumferential direction of less than the full circumference of the housing to permit rotation of the zoom adjustment ring in the first and second circumferential directions. The slot will, in general have a width in the axial direction sufficient to permit movement of the pin in the axial direction as the zoom adjustment ring is moved between the locked and unlocked position. In this way, the zoom adjustment ring can be rotated across a range to achieve a desired zoom magnification at a corresponding desired rotational position, and then locked to set the desired zoom magnification.

The slot will, in general be at all times covered over by the zoom adjustment ring, which may have a pair of O-ring seals on either axial side of the slot, extending fully around an interface between the ring and the housing to provide an atmospheric seal between the slot and the surrounding ambient air. There may, however, be further seals within the housing.

The zoom system preferably has a zoom drive mechanism comprising a pair of concentric tubes held within the housing, an outer one of the tubes being rotatable about an optical axis of the optical system and an inner tube being axially movable along the optical axis and holding a lens system comprising at least one lens element which when moved axially in a first direction increases the magnification and when moved axially in an opposite second direction decreases the magnification.

In a preferred embodiment of the invention, the axially movable lens system is an image erector lens system.

The optical axis is preferably substantially coincident with a rotational axis of the zoom adjustment ring.

A linkage may be provided between the inner and outer tubes which translates the rotational movement of the outer tube to axial movement of the inner tube. In preferred embodiments of the invention, the linkage comprises a pair of helical slots in the outer tube which engage with a pair of radially outwards projecting pins on the inner tube, the inner tube being constrained to move axially by engagement of a further pin with an axially extending slot in an axially and rotationally fixed intermediate tube between the inner and outer tubes. The intermediate tube may, conveniently, also be used at an end proximate the ocular of the housing, to hold the sighting element, for example a reticle.

The assembled concentric inner, outer and intermediate tubes, are preferably mounted at a gimbal mount at one end nearest the ocular end of the housing, and near the opposite end of the assembly preferably are movable in orthogonal X and Y directions (the optical axis being the Z direction) by windage and elevation sighting mechanisms.

The radially inwardly extending pin from the zoom adjustment ring may be engaged with the outer tube, whereby rotation of the zoom adjustment ring is translated directly into rotation of the outer tube. The engagement of the pin and the outer tube is configured to accommodate relative axial movement between the pin and the outer tube as the zoom adjustment ring is moved between locked and unlocked positions without causing axial movement of the outer tube.

In preferred embodiments of the invention, the pin is engaged with a hole in the outer tube. The pin may be substantially cylindrical and the hole elongate in the axial direction to permit the pin to move axially in the hole relative to the outer tube as the zoom adjustment ring is moved between locked and unlocked positions without causing axial movement of the outer tube.

The interengaging formations between the housing and the zoom adjustment ring need not extend around the full circumference of the housing.

This may be advantageous in allowing air to escape, which could otherwise be compressed or expanded owing to relative movement of the ring and housing and consequent opening or closing of cavities between the ring and housing.

Therefore, there may be at least one gap in said interengaging formations, with the housing and the zoom adjustment ring being configured to provide a passage for air to pass through the gap to equalise air pressure between the zoom adjustment ring and the housing as the zoom adjustment ring is moved between locked and unlocked positions.

Preferably, this passage is provided by a channel in the housing at the lowermost part of the interface between the housing and ring, so that this channel can also provide an egress point for any moisture.

BRIEF DESCRIPTION OF THE DRAWINGS

The invention will now be described by way of example only, and with reference to the accompanying drawings, in which:

FIGS. 3 and 4 are sections through the scope of FIG. 1, taken along an optical axis of the scope that extends between ocular and objective lens systems, showing how the zoom adjustment ring is movable in an axial direction between two positions, namely a first or forwards position farthest from the ocular end of the housing and a second or rearwards position nearest the ocular end of the housing;

FIG. 14 is a perspective view of the scope of FIG. 13, cut away to show the internal components of the scope housing, which are the same as in the first embodiment;

FIG. 15 is an is an enlarged view of parts of the scope of FIG. 14, showing three O-rings providing similar functions to those mentioned above with respect to FIG. 5, and with an additional enlarged view of the part of the interengaging formation on the outside surface of the housing, showing how axially forwards tips of each tooth are tapered or rounded to aid intermeshing of each tooth with receiving grooves in the other part of the interengaging formation on the inside surface of the zoom adjustment ring;

DETAILED DESCRIPTION

Figure 1:
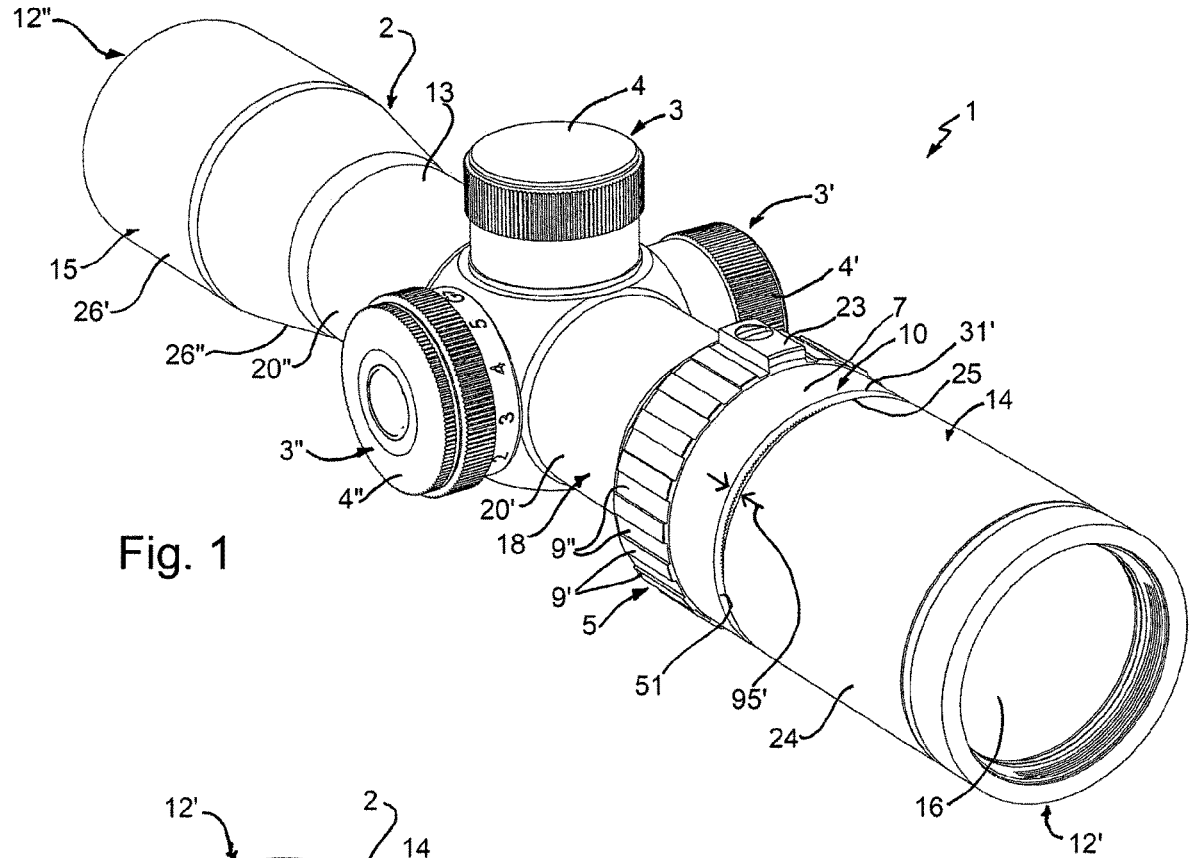
FIG. 1 is a perspective view of a telescopic sight, also a called a scope, with a manually adjustable zoom mechanism for a hand-held weapon according to a first preferred embodiment of the invention, illustrated with an ocular end of the housing being nearest, the scope comprising a housing on which are mounted various hand operable controls, the zoom mechanism including a zoom adjustment ring which is between an ocular end of the housing and a saddle portion of the housing.
Figure 2:
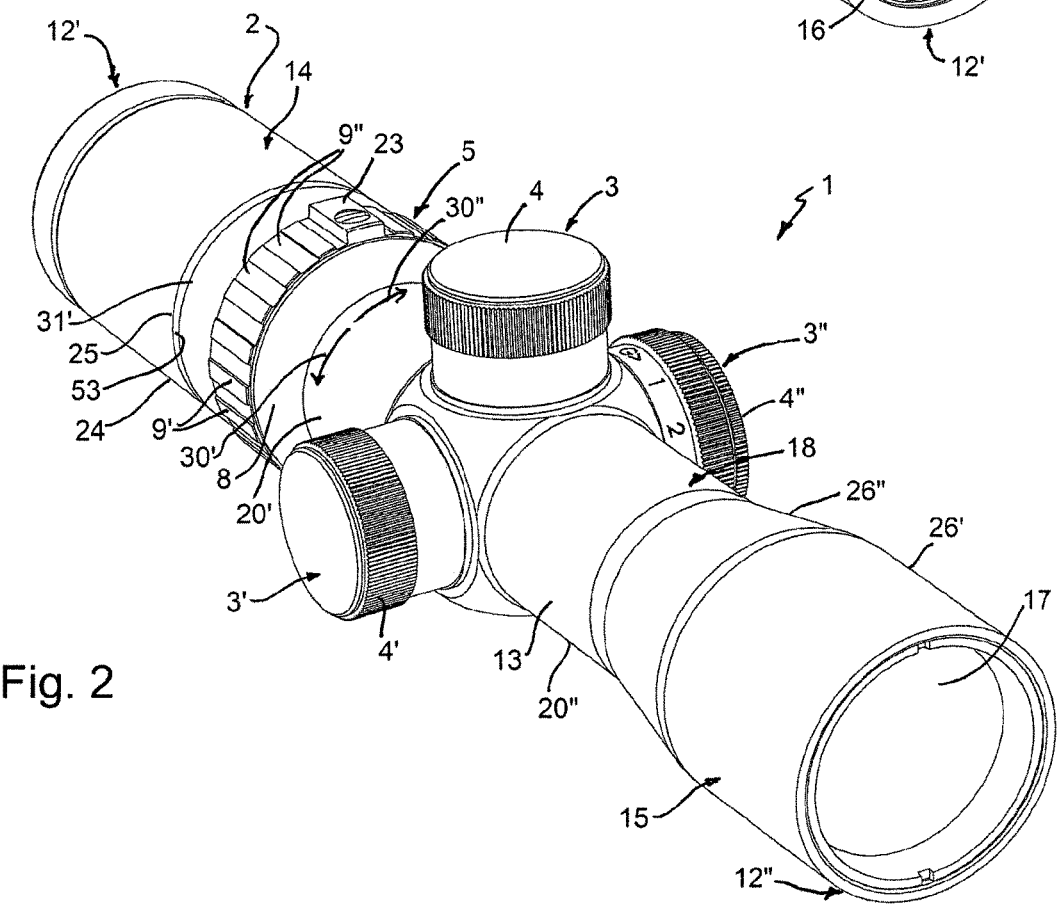
FIG. 2 is a perspective view of the scope of FIG. 1, illustrated with an objective end of the housing nearest.

FIGS. 1 and 2 show the external parts of a telescopic sight, more generally called a scope 1, having an elongate and generally cylindrical housing 2 which houses internal optical and mechanical components of the telescopic sight, to be described in detail below. The housing is tube-like and has outer surfaces on which are mounted various hand operable controls, including: elevation and windage manual adjustment controls 3, 3', each of which has a rotatable control knob 4, 4' which, when turned, causes an aiming point to move up/down or left/right; a reticle illumination control 3", also with a rotatable control knob 4"; and a rotatable manual zoom adjustment control in the form of a zoom adjustment ring 5. The control knobs are positioned transversely midway along the length of the housing 2. These control knobs are of conventional a construction and use, which will be familiar to those skilled in the art, as so for the sake of conciseness will not be further described.

The zoom adjustment ring 5 extends circumferentially around the housing 2, and is manually rotatable in opposite first and second circumferential directions 30', 30". The zoom adjustment ring 5 is part of a zoom mechanism for manually changing the magnification of a target image presented to a user at an ocular end (also called an eyepiece end) 12' of the housing 2 from light gathered by a forwards or objective end 12" of the housing.

With reference now also to FIGS. 3 and 4, the housing 2 is generally tubular and may be formed from more than one component. In this example, the housing 2 comprises, extending forwards from the ocular end 12' of the housing, an ocular housing 19, which holds an ocular lens system 16. The ocular housing 19 has a substantially cylindrical outer surface 24 which extends from the ocular end 12' forwards towards the zoom adjustment ring 5. Fitted to a forwards portion of the of the ocular housing 19 is a tubular housing main body 18 which extends forwards to the objective end 12" of the telescopic sight 1. The zoom adjustment ring 5 spans, and therefore conceals from external view, a join 55 between the ocular housing 19 and the housing main body 18.

The housing main body 18 extends forwards from the ocular housing 19 to provide a central portion 13 of the housing 2, and forwards of the central portion of the housing also an objective housing 15. The objective housing need not be formed as one-piece with the housing central portion 13 and may, alternatively, be a housing component fitted to the housing central portion 13. The objective housing holds an objective lens system 17. The objective housing 15 has a substantially cylindrical outer surface 26' which extends from the objective end 12" rearwards to an inwardly tapering frusto-conical surface 26" of the objective housing 15, which then terminates at central portion 13 of the housing.

As shown in FIGS. 3 and 4, the ocular and objective lens systems 16, 17 may be multiple-component lenses, i.e. a multiple lens system. However, it would be possible for either or each of the lens systems to employ at least a single aspheric lens and so the singular term "lens system" in this specification includes all lens systems having at least one lens element. The ocular and objective lens systems 16, 17 define an optical axis 21 of an optical system housed by the housing 2 of the telescopic sight. In this example, the optical axis 21 is preferably substantially the same as a rotational axis 21' of the zoom adjustment ring, and preferably also substantially the same as the mechanical axes of both the housing main body 18 and the ocular housing 19. This axis 21, 21' therefore defines orthogonal axial and radial directions not just for the zoom adjustment ring, but for the housing 2 and optical system as a whole.

The telescopic sight 1 comprises an image erector lens system 64, housed within the housing 2, which is between a front focal plane (FFP) 11' and second focal plane (SFP) 11" between the ocular and objective lens systems 16, 17. The main optical components of the optical system housed by the housing are therefore the ocular and objective lens systems 16, 17 and the image erector lens system 64, plus any sighting elements, however these are not normally lens elements and so do not define an optical axis of the optical system.

The central portion 13 of the housing main body 18 has an outer surface with generally cylindrical surfaces 20', 20" on either axial side of the manual adjustment controls 3, 3', 3", leading up to the objective and ocular housings 15, 19. These cylindrical surfaces 20', 20" are coaxial with and of lesser diameter than the neighbouring cylindrical surfaces 24, 26' of the ocular and objective housings 19, 15. Because of this, the central portion 13 of the housing 2 is referred to as a saddle 13 of the housing 2, and the relatively larger diameter ocular housing and objective housing are referred to, respectively as an ocular bell 14 and an objective bell 15.

As will be explained in more detail below, the zoom adjustment ring 5 is slideably mounted on the central portion 13 of the housing where this meets the ocular housing 19 so that the zoom adjustment ring may be moved axially between limits both towards and away from the ocular housing as well as in opposite circumferential directions to effect a change in zoom magnification.

The zoom adjustment ring 5 extends in an axial direction between a rearwards end 31' and a forward end 31". The diameter of the cylindrical outer surface of the zoom adjustment ring 5 along its rearwards end 31' is substantially the same as that of cylindrical outer surface 24 of the ocular housing 19.

A forward end 25 of the outer surface 24 of the ocular bell 14 ends at a circumferentially extending shoulder 53, which extends radially inwards from this outer surface. The ocular housing comprises forwards of the shoulder a forward portion 50, which comprises a radially outwards facing surface 54 of reduced outer diameter relative to that of the outer surface 24 of the ocular bell 14. The outwards facing surface 54 is generally cylindrical has several circumferentially extending bands, to be explained in more detail below.

In this example, the forward portion 50 is a sleeve that extends axially forwards and is of reduced outer diameter relative to that of the cylindrical outer surface 24. The sleeve is substantially cylindrical, having a cylindrical inner surface 56 which is fitted around the cylindrical outer surface 20' of the housing main body 18, for example by mating threads. Each band of the radially outwards facing surface is stepped radially inwards relative to the cylindrical outer surface 24 of the ocular housing. These bands extend around the circumference of the forwards portion of 50 and interact with the rotatable zoom adjustment ring 5, to be explained in more detail below.

The rotatable zoom adjustment ring 5 is located at a transition between the ocular housing 19 and the housing saddle or central portion 13. The ring comprises a main band 6 that extends circumferentially around the housing main body nearest the ocular housing. The main band 6 is provided forwards of a rearward portion 10 of the zoom adjustment ring 5. The rearward portion 10 has a cylindrical outer surface 7 of a radius and concentricity closely matching that of the substantially cylindrical outer surface 24 of the ocular housing 19. The main band 6 may be adapted to facilitate manual adjustment, and so is preferably provided with textured grip features, in this example radially raised and lowered portions 9', 9" which alternate around the ring circumference between an axially extending ridge 23. The portion of the main band that is provided with the grip features 9', 9" preferably has a substantially cylindrical shape. Forwards of the grip features, the main band comprises a tapered forwards portion or ramp. In this example, this tapered forwards portion is a forwardly directed cylindrical chamfer 8, which has a forwards tapering frustoconical outer surface. The forwards end of the cylindrical chamfer 8 defines the forwards end 31" of the zoom adjustment ring 5. Together with the cylindrical outer surface 7 and the substantially cylindrical portion and cylindrical chamfer of the main band 6, the zoom adjustment ring provides a smooth transition between the relatively larger outer diameter of the ocular bell 14 and the relatively smaller diameter saddle or central portion 13 of the housing.

The zoom adjustment ring 5 may also have an indicator feature to indicate its rotational orientation, for example a bump or projection which in this example is the axially extending ridge 23 on the main band 6 of the zoom adjustment ring 5.

The rearward portion 10 of the zoom adjustment ring 5 is, in this example, in the form of a skirt that extends in an axial direction rearwardly from the main band. The cylindrical outer surface 7 is therefore the outer surface of the skirt. The rearward portion terminates at an annular end face 51 that extends in a radial plane and which therefore also defines the rearward end 31' of the zoom adjustment ring. An inner surface 52 of the rearward portion 10, which is generally cylindrical has several circumferentially extending bands, to be explained in more detail below.

FIGS. 3 and 4 show how the zoom adjustment ring 5 is movable in forwards 27' and rearwards 27" axial directions between two positions, namely a first or forwards position farthest from the ocular end 12' of the housing 2 and a second or rearwards position nearest the ocular end of the housing. When the zoom adjustment ring 5 is moved axially forwards 27', as shown in FIGS. 1, 2 and 3, a gap opens up 95' between the forwards end 25 of the of the cylindrical outer surface 24 of the ocular housing 19 and the rearwards end 31' of the zoom adjustment ring 5, which is also the rearwards end of the cylindrical outer surface 7 of the zoom adjustment ring 5. When the zoom adjustment ring 5 is moved axially rearwards 27", as shown in FIG. 4, the gap closes 95" as opposite sides come into abutting contact, and because the outer diameters of the adjacent cylindrical surfaces 7, 24 on either side of the closed gap are substantially the same, the zoom adjustment has the appearance of blending into the ocular bell 14.

In this example, the zoom adjustment ring 5 is locked against rotation when in the forwards position and free to rotate when in the rearwards position. In the second embodiment of a telescopic sight 101 shown in FIGS. 12 to 15, this functionality is reversed, so that the zoom adjustment ring is locked against rotation when in the rearwards position and free to rotate when in the forwards position. Apart from this difference in operation, both embodiments of the telescopic sight 1, 101 are the same.

The zoom adjustment ring 5 moves by sliding axially or circumferentially over the central portion 13 of the housing while being supported primarily by two O-rings, a rearward sealing O-ring 32' and a forward sealing O-ring 32", each of which is fixed or seated inside corresponding circumferentially extending rearward and forward grooves 28', 28" in the outer cylindrical surface 20' of the central portion 13 of the housing 2. The two O-rings 32', 32" are therefore located between the central portion 13 of the housing and a corresponding inner cylindrical surface 38 of the zoom adjustment ring 5. In this example, this inner cylindrical surface is provided by the main band 6. The seating grooves 28', 28" for two of the O-rings 32', 32" are in the outer cylindrical surface 20' of the housing central portion 13 where this is concealed beneath the zoom adjustment ring 5.

The groove 29 for the third one of these O-rings 33 is in the outer surface 54 of the forward portion 50 of the ocular housing 19.

Figure 6:
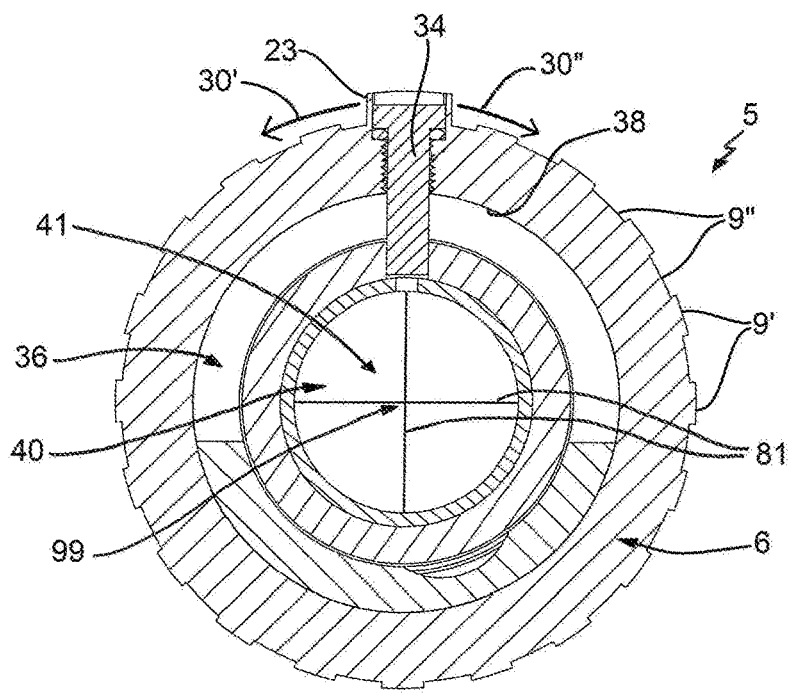
FIG. 6 is a cross-section view through the scope, taken along line VI-VI of FIG. 5 in the direction of an image sighting element, which in this example is a reticle that is illustrated as having simple crosshairs.

The three O-rings 32', 32", 33 are therefore all located in an interface between the zoom adjustment ring 5 and the housing 2. The two of the O-rings 32', 32" seated in the housing central portion 13, proximate the join 55 between the housing main body 18 and ocular housing 19, provide a seal either side of a circumferentially extending channel 36 through the housing which provides passage of a zoom actuation bolt 34 that extends radially inwards from the inner cylindrical surface 38 of the zoom adjustment ring. As shown in the cross-section of FIG. 6, this channel 36 does not extend around the full circumference of the housing main body 18 and in this example extends over somewhat more than 180° to permit the bolt, and hence the zoom adjustment ring 5 to be rotated±90° either side of a central zoom position, as shown in FIG. 6.

The zoom adjustment ring 5 has on its inner surface 52 a pair of shallow circumferentially extending recesses or seats, namely a first, forwards seat 37 and a second, rearwards seat 37'. The configuration is such that the O-rings 32', 32", 33, which are of a resiliently flexible material, for example a silicone rubber, tend to protrude beyond the adjacent housing outer surfaces 20', 54, so that these press against the corresponding inner surfaces 52, 38 of the zoom adjustment ring 5. The two of the O-rings 32', 32" seated in the housing central portion 13 help to provide the seal either side of the channel 36 for the zoom adjustment actuation bolt. The third O-ring 33 provides a bias force to locate and hold the zoom adjustment ring in either the first or second axial positions, as this seats inside one of two the circumferentially extending recesses or shallow grooves 37, 37', spaced axially apart on the inner surface 52 of the of the rearward portion 10.

The third, or zoom adjustment ring seating, O-ring 33 does not provide a seal, as an air escape passage 35 is provided in the inner surface 52 of the rearward portion 10 of the zoom adjustment ring around this O-ring to allow air to enter or escape from a void 39 (see FIG. 3) as the zoom adjustment ring is slid axially 27', 27".

The invention therefore provides a zoom adjustment ring 5 which is, in use, automatically located axially in one of two operative positions: a zoom adjust position, and a zoom lock position. The user can readily switch the zoom adjustment ring between these two positions so that zoom may be manually set to the desired magnification and then locked at this magnification, without having to move or activate any other component except the zoom adjustment ring itself.

Figure 5:
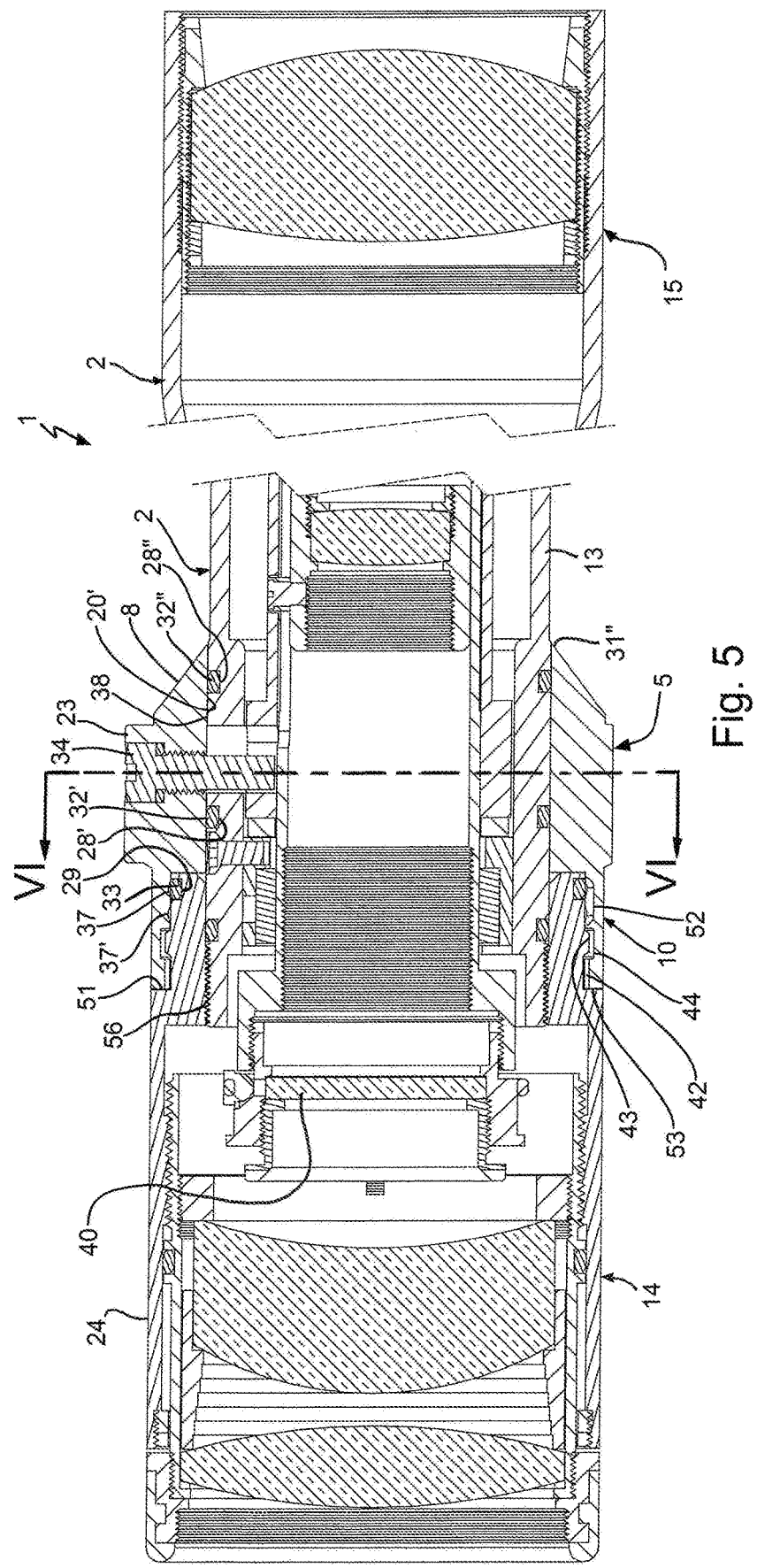
FIG. 5 is an enlarged view of portions of FIG. 4, showing three O-rings fixed inside grooves in an outer surface of the housing, these O-rings being located in an interface between the zoom adjustment ring and the housing, two of the O-rings providing a seal either side of a circumferentially extending channel through the housing allowing passage of a zoom actuation bolt that extends radially inwards from the zoom adjustment ring, and the third one of which engages with one of two circumferential recesses or seats inside the ring to bias and hold the zoom adjustment ring in either the first or second axial positions.

The cross-section of FIG. 6 shows the configuration of the zoom actuation bolt 34, the channel 36 for the bolt 34, and some of the other internal components of the zoom mechanism. A sighting element 40, which in this example is a circular reticle, also depicted in cross-section in FIGS. 3-5, provides a graphic image pattern 41, which in this example is a simple crosshairs 81. The intersection of the crosshairs 81 provides an aiming point 99 in the image presented to a user. The invention may, however, be used with any suitable type of sighting element. A specific example of a reticle pattern, is explained in more detail below with reference to FIGS. 18 and 19.

Figure 7:
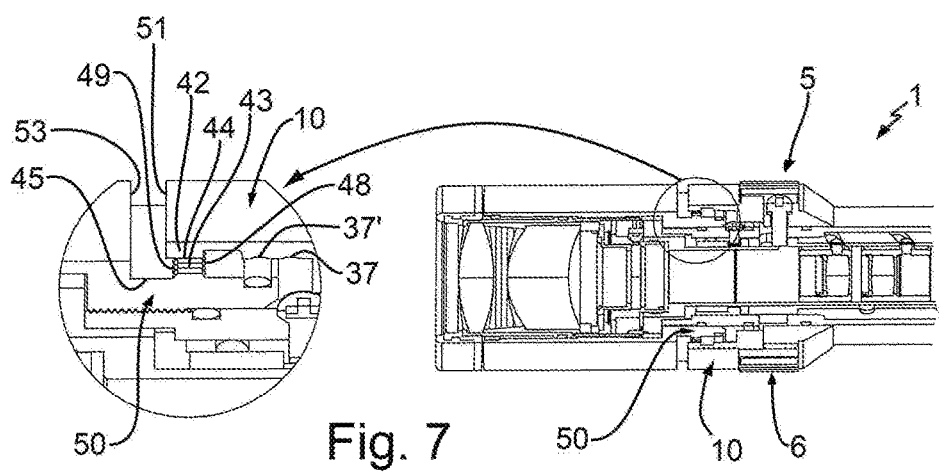
FIG. 7 is a cut away view of a rear portion of the scope of FIG. 3, part of which is enlarged to show how the zoom adjustment ring and housing have therebetween interengaging formations which, in this example, are in the form of teeth or splines that slide axially into engagement with each other when the ring is moved forwards to a locked configuration in which the formations engage, thereby locking the ring against circumferential rotation.
Figure 8:
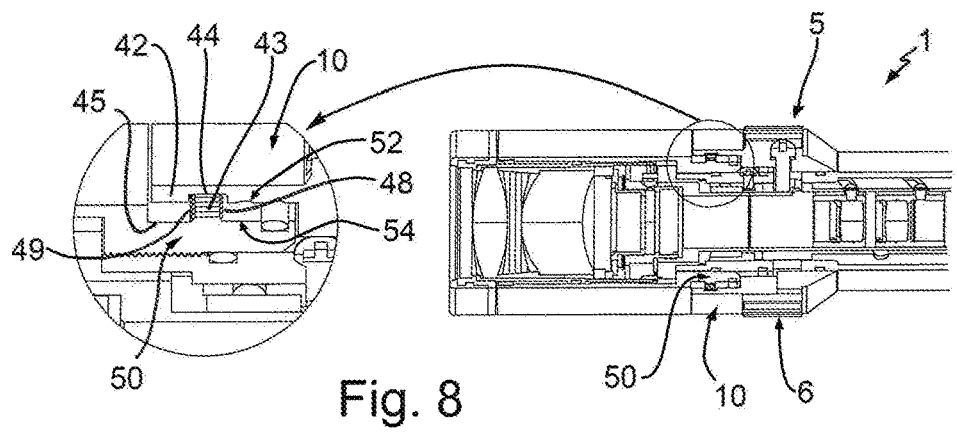
FIG. 8 is cut away view of a rear portion of the scope of FIG. 3, part of which is enlarged to show how the teeth or splines slide axially out of engagement to permit rotation of the zoom adjustment ring when the ring is axially moved rearwardly to an unlocked configuration in which the formations disengage.

FIGS. 7 and 8 show cut away views of a rear portion of the telescopic sight 1, parts of which are enlarged to show how the rearward portion 10, or skirt, of the zoom adjustment ring 5 and the forward portion 50, or sleeve, of the ocular housing 19, have therebetween interengaging formations (see also FIG. 5) which, in this example, are in the form of teeth or splines 42, 43. In this example, there is one set of radially inwardly directed teeth 42 provided on the inner circumferential surface 52 of the skirt and another set of radially outwardly directed teeth 43 provided on the outer circumferential surface of the sleeve 50. The teeth 42, 43 slide axially into interleaved engagement with each other when the ring is moved forwards 27' to a locked configuration in which the formations engage, thereby locking the ring against circumferential rotation, and then slide axially out of interleaved engagement to permit rotation of the zoom adjustment ring when the ring is axially moved rearwardly 27" to an unlocked configuration in which the formations disengage.

The expanded views of the teeth 43 show how axially forwards and rearwards tips 48, 49 of each tooth are tapered or rounded to aid intermeshing of each tooth with receiving grooves in the other part of the interengaging formation on the inside surface 52 of the zoom adjustment ring 5.

The inner surface 52 of the rearward portion 10 of the zoom adjustment ring 5 also comprises a circumferential groove 44 which aligns with the teeth 43 on the outer surface 54 of the of the forward portion 50 of the ocular housing 19 when the zoom adjustment ring is in the unlocked orientation. Similarly, this outer surface 54 comprises a band of reduced radius which presents a circumferential groove 45 which aligns with the teeth 42 on the zoom adjustment ring inner surface 52 when the zoom adjustment ring is in the unlocked orientation. Together, this arrangement permits movement of both sets of teeth 42, 43 with respect to the opposing surface 52, 54 when the zoom adjustment ring is in the unlocked configuration.

Figure 9:
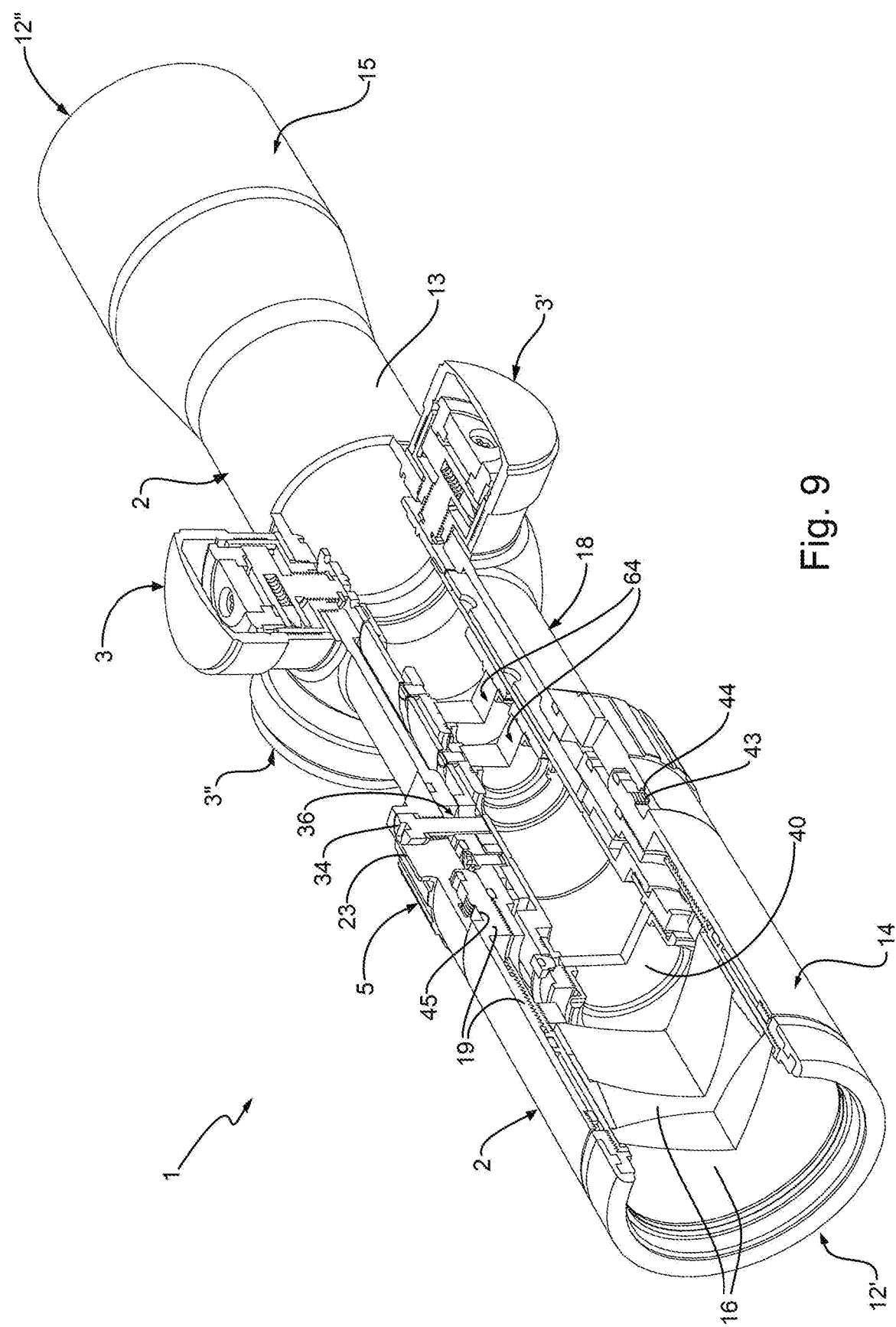
FIGS. 9 to 11 are perspective views of the scope when the zoom adjustment ring is unlocked, as in FIG. 4, showing how rotation of the zoom adjustment ring causes an image erector tube that holds image erector lens system to move axially along the optical axis of the scope, the zoom magnification being highest when the erector lens system is farthest from the ocular lens system, as shown in FIG. 10 and being lowest when nearest the ocular lens system, as shown in FIG. 11.
Figure 10:
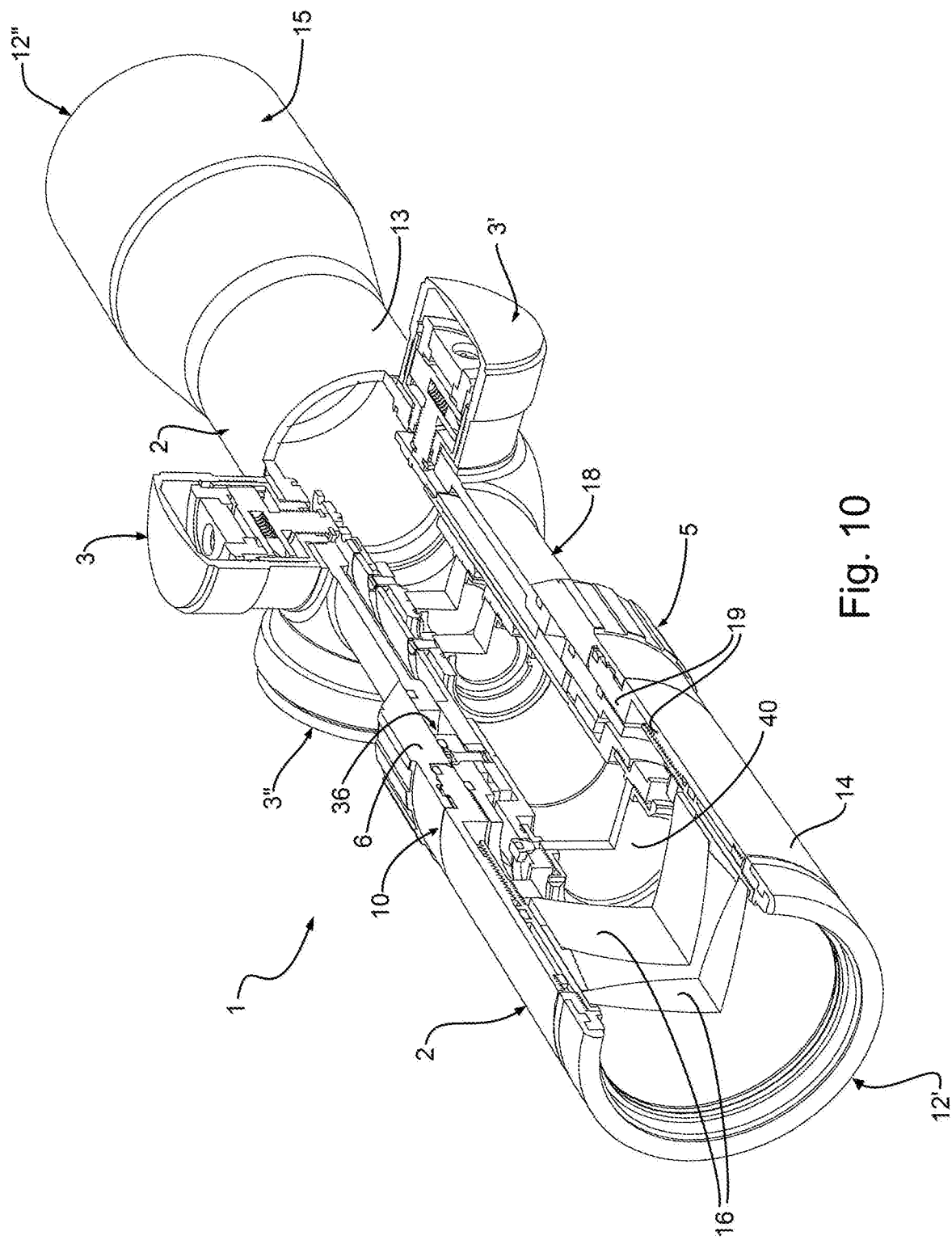
Figure 11:
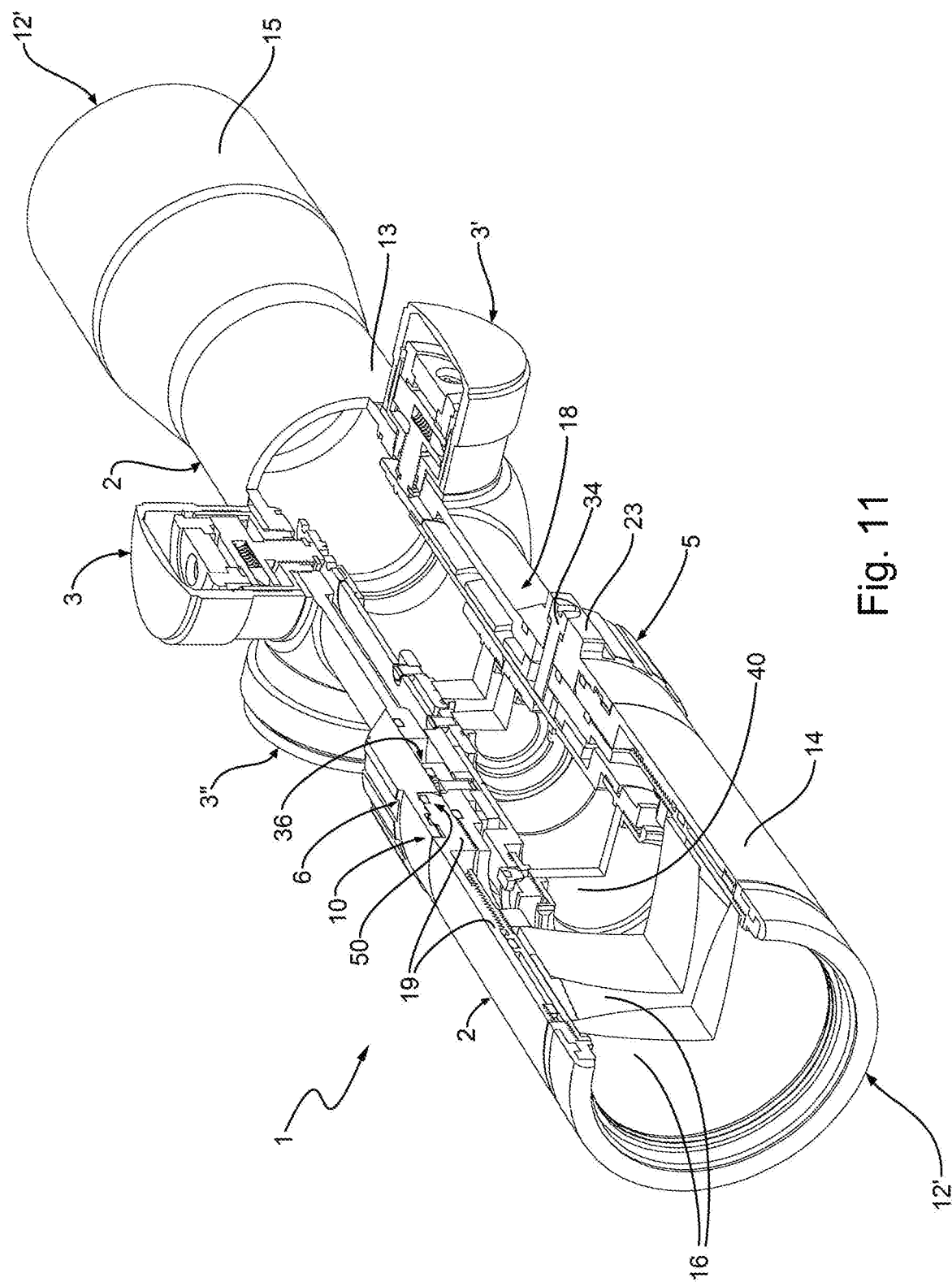

FIGS. 9 to 11 are perspective views of the telescopic sight when the zoom adjustment ring 5 is unlocked, as in FIG. 4, showing how rotation of the zoom adjustment ring causes an image erector tube 63 that holds an image erector lens system 64 to move axially along the optical axis 21 of the telescopic sight 1. As will be explained in more detail below, in this example the image erector tube is composed of two axially spaced apart tubes 63', 63" forming an inner tube grouping 63, and the image erector lens system 64 is composed of two lens elements 64', 64" held by this pair of tubes. The zoom magnification is highest when the erector lens system 64 is farthest from the ocular lens system 16, as shown in FIG. 10 and is lowest when nearest the ocular lens system, as shown in FIG. 11.

FIGS. 12 to 15 show a second preferred embodiment of a telescopic sight 101 in accordance with the invention, in which components or features which are the same as in the telescopic sight 1 of the first embodiment and enumerated with the same reference numbers and components or features which are similar or analogous are indicated using reference numbers incremented by 100.

Figure 12:
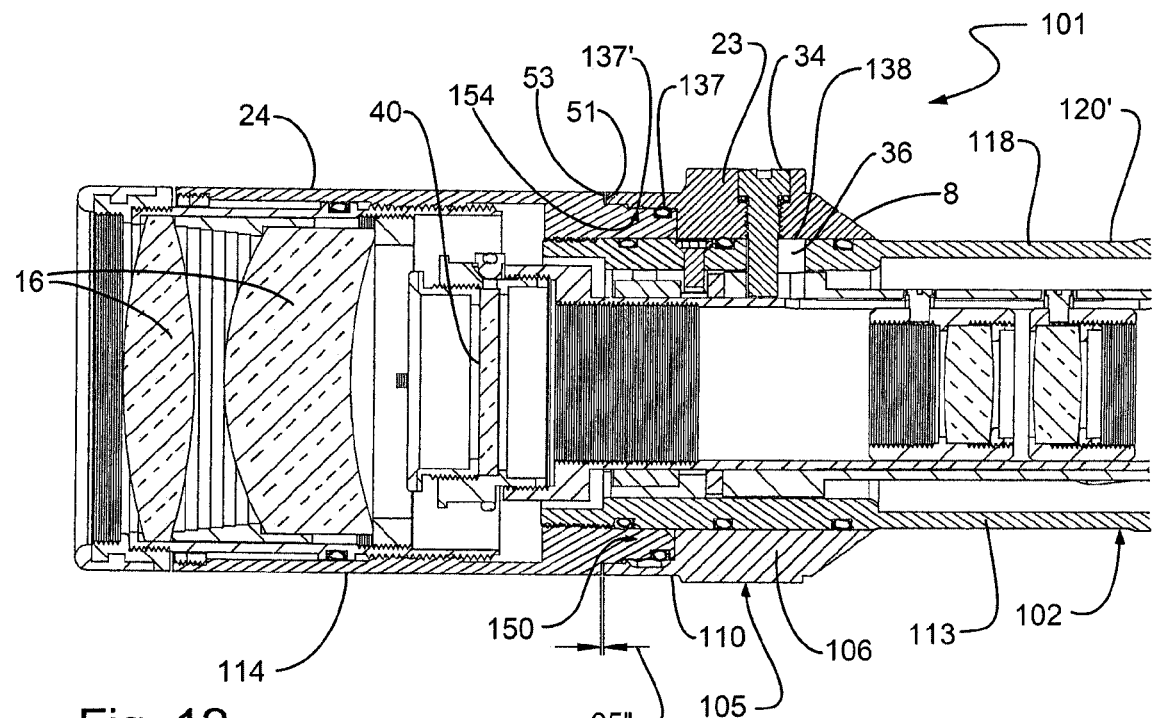
FIGS. 12 and 13 are section views along the optical axis of a portion of a telescopic sight, or scope, with a manually adjustable zoom mechanism for a hand-held weapon according to a second preferred embodiment of the invention, the second embodiment being the same as the first embodiment except in the arrangement of the interengaging formations, which are engaged to lock the zoom adjustment ring against rotation when moved rearwardly, as shown in FIG. 12, and which are disengaged to permit ring rotation when moved axially in a forwards direction, as shown in FIG. 13.
Figure 13:
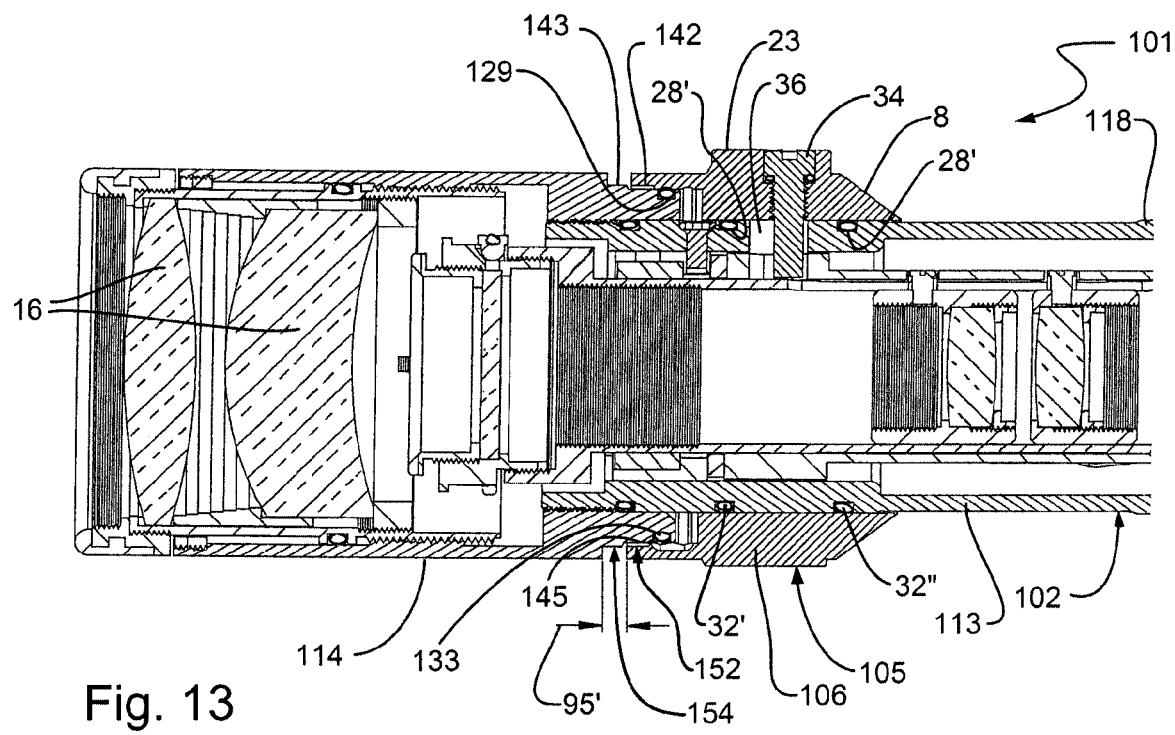

The second embodiment 101 is the same as the first embodiment 1 except in the arrangement of the interengaging formations 142, 143, which are engaged to lock the zoom adjustment ring against rotation when moved rearwardly, as shown in FIG. 12, and which disengage to permit ring rotation when moved axially in a forwards direction, as shown in FIG. 13.

FIG. 14 is a perspective view of the telescopic sight of FIG. 13, cut away to show the internal components of a housing 102 of the telescopic sight, which are the same as in the first embodiment 1.

FIG. 15 is an enlarged view of parts of the telescopic sight of FIG. 14, including a second embodiment of a zoom adjustment ring 105, and showing three O-rings 32', 32", 133 providing similar functions to those mentioned above with respect to FIG. 5. As in the first embodiment, the O-rings 32', 32", 133 are each fixed or seated inside a corresponding groove 28', 28", 129 in an outer surface the housing 102. The seating grooves 28', 28" for two of the O-rings 32', 32" are in an outer surface 120' of a main housing body 118. The groove 29 for the third one of these O-rings 33 is in the outer surface 154 of the of a forward portion 150 of an ocular housing 119.

The three O-rings 32', 32", 33 are all located in an interface between the zoom adjustment ring 105 and the housing 2. The two of the O-rings 31, 32 seated in the main housing main body 118 provide a seal either side of the circumferentially extending channel 36 through the housing which provides passage of the zoom actuation bolt 34 that extends radially inwards from an inner cylindrical surface 138 of a main band 106 of the zoom adjustment ring 105.

FIG. 15 also shows an additional enlarged view of a rearward portion 110 of the zoom adjustment ring 105 and the forward portion 150 of the ocular housing 119, showing how these have corresponding inwardly facing and outwardly facing surfaces 152, 154 similar to those of the first embodiment 1, but with the axial order of a pair of interengaging formations of sets of teeth 142, 143 being reversed. Axially forwards tips 148 of each outwardly directed tooth 143 are tapered or rounded to aid intermeshing of each tooth with receiving grooves between the inwardly directed teeth 142 of the interengaging formation on the inside surface 152 of the rearward portion 110 of the zoom adjustment ring 105.

In this embodiment, the zoom adjustment ring 105 has no need of an equivalent to the circumferential groove 44 of the first embodiment, as the rearward edge 31' of the zoom adjustment ring 105 moves forwards out of the way of the outwardly directed housing teeth 143 when in the disengaged orientation.

As in the first embodiment, the outwardly facing surface 154 of the forward portion 150 of the ocular housing 119 has a circumferential groove 145 which aligns with the inwardly directed teeth 142 on the opposing inner surface 152 when the zoom adjustment ring is in the unlocked orientation. This arrangement permits movement of the inwardly directed teeth 142 to disengage with respect to the opposing surface 154 when the zoom adjustment ring is in the unlocked configuration.

As shown in FIGS. 12, 13 and 15, the zoom adjustment ring moves to open and close the gap 95', 95" between the locked and unlocked orientations. In both embodiments, the gap 95' is 2.5 mm wide when opened.

Figure 16:
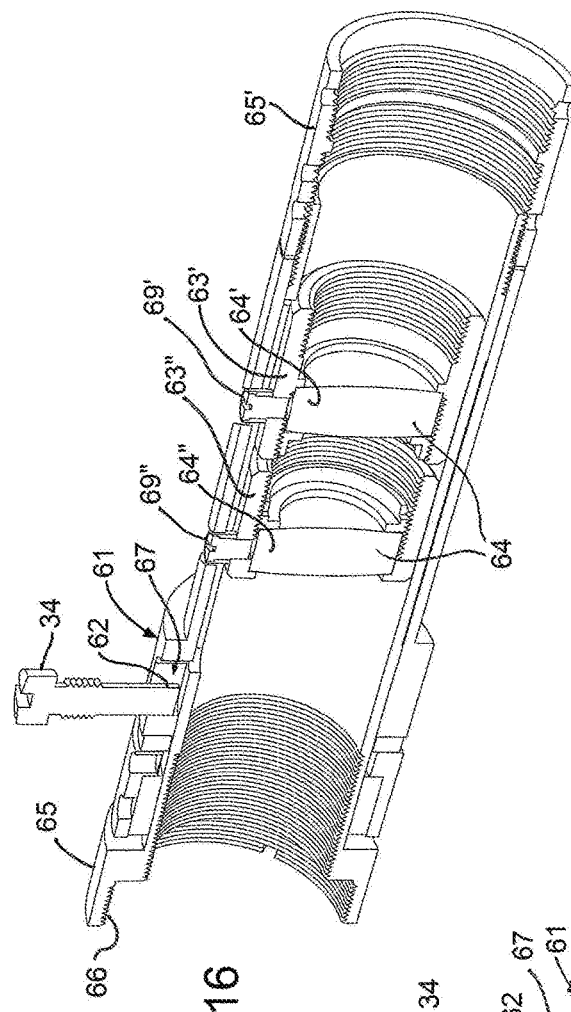
FIG. 16 is a perspective view of the internal components of the zoom mechanism common to both of the preferred embodiments of the invention (i.e. less the zoom magnification ring), shown cut through along a central axial plane, and comprising the zoom actuation bolt, an outer rotatable tube with which an end of the bolt is engaged, an inner axially movable tube, which in this example is also the image erector tube; and an intermediate tube which is pivotable in orthogonal radial direction from its rear end which has a mount for the sighting element.
Figure 17:
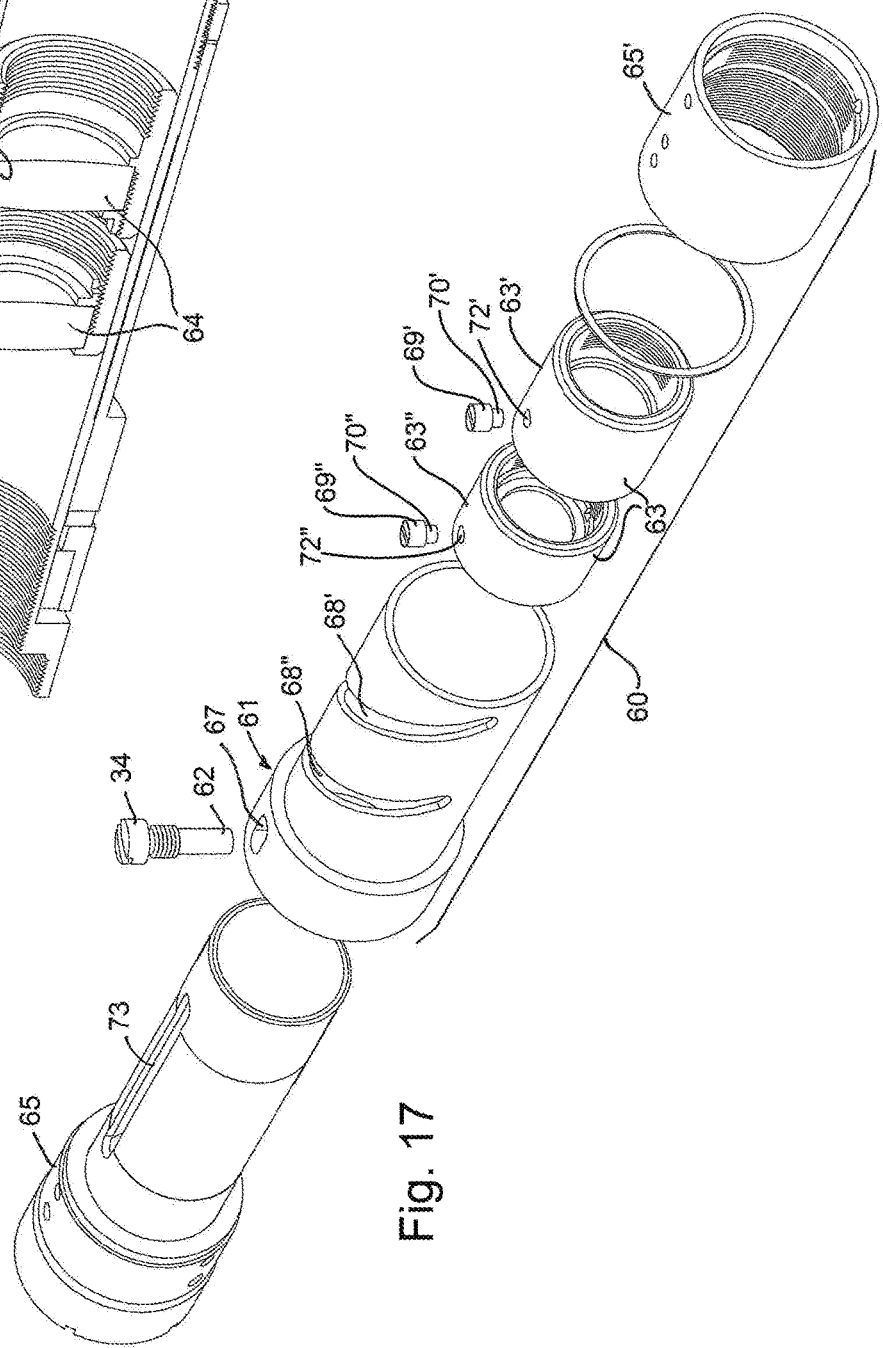
FIG. 17 is an exploded view of the zoom mechanism components of FIG. 16, showing how a tip of the bolt seats inside an axially elongate slot in the outer rotatable tube which has a pair of helical slots spaced axially apart, the helical slots guiding heads of a pair of bolts that extend radially outwards from the inner tube, the intermediate tube having an axially extending slot which constrains the pair of bolts, and hence the inner tube, to move axially as the rotating helical slots drive the movement of the inner tube.

FIGS. 16 and 17 are, respectively perspective and exploded views of the internal components (i.e. less the zoom magnification ring) of the zoom mechanism that provide an optical zoom system 60 common to all three of the preferred embodiments of the invention. The optical zoom system 60 is linked to the zoom adjustment ring 8, 108 by the zoom actuation bolt 34. The optical zoom system 60 comprises an outer rotatable tube 61 with which an end portion 62 of the zoom actuation bolt 34 is engaged, an inner axially movable tube, which in this example is an axially movable inner tube grouping 63 pair of two separate inner tubes 63', 63", each one holding a lens element 64', 64" which move in lock step to provide the image erector lens system 64 between the ocular and objective lens systems 16, 17. The internal components also comprise an intermediate tube 65 which includes a forwards extension tube 65', and which does not rotate but which is pivotable in orthogonal radial directions from its rear end which has a threaded mount 66 for the sighting element 40.

The end portion 62 of the zoom actuation bolt 34 seats inside an axially elongate slot 67 in the outer rotatable tube 61. The outer rotatable tube also has a pair of helical slots 68', 68" spaced axially apart. The helical slots guide corresponding heads 69', 69" of a pair of bolts 70', 70" that are screwed from the outside into bores 72', 72" in each one of the pair of inner tubes 63', 63". The intermediate tube 65 has an axially extending slot 73 which constrains the heads of the pair of bolts, and hence the inner tube grouping 63, to move axially as the rotating helical slots drive the movement of the inner tube grouping.

In this arrangement, it is to be noted that the elongate slot permits relative movement of the zoom adjustment ring between the clocked and unlocked positions, and is also compatible to transmit the drive rotation with the locked position being either the forwards orientation, as in the first embodiment, or the rearwards orientation, as in the second embodiment.

Figure 18:
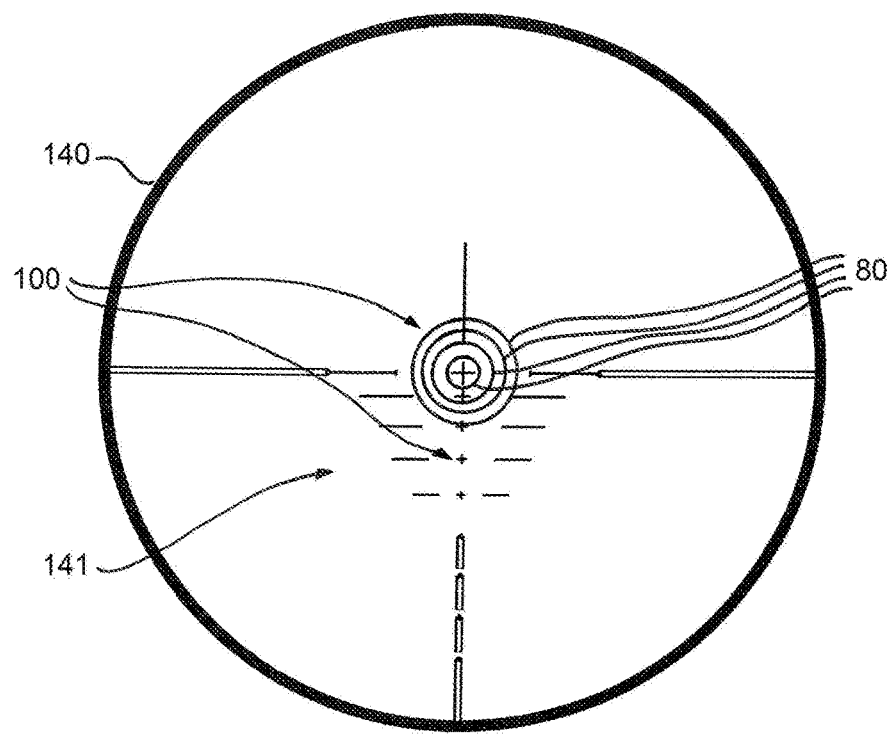
FIG. 18 is an example of a reticle that has an image pattern which is particularly useful when used with a crossbow, and which may therefore be used in place of the simple crosshairs of FIG. 6.

FIG. 18 is an example of a sighting element 140, in this example a circular reticle, having a graphic image pattern 141, also called a "reticle pattern", which is particularly useful when used with a crossbow, and which may therefore be used in place of the simple crosshairs 81 of FIG. 6. Centered behind the graphic image pattern 141 is a target image 80 represented schematically here by four concentric rings. The target image 80 and graphic image pattern 141 together compose a telescopic image 100 viewed by a user of the telescopic sight.

Figure 19:
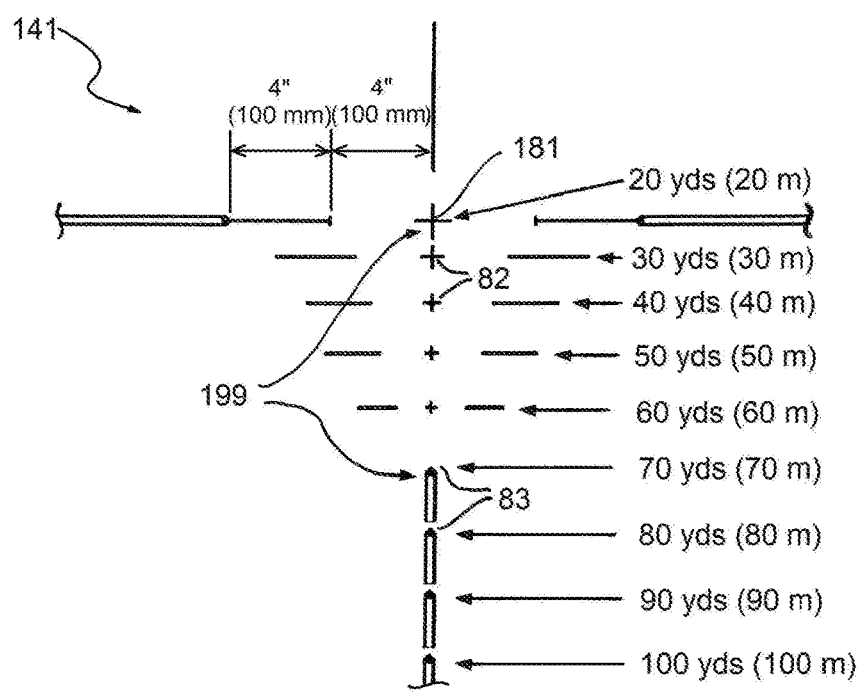
FIG. 19 is an annotated enlarged view of the markings of the image pattern of the reticle of FIG. 18.

FIG. 19 is an annotated and enlarged view of the markings of this graphic image pattern 141. The pattern comprises a central crosshairs 181, and directly beneath this a plurality of relatively smaller additional crosshairs 82 and post markers 83. Each of these graphic marks provides an aiming point 199 suitable for use at different distances, in steps of 10 yards. as illustrated in FIG. 19. As can be seen, the central cross hairs zero sighted position in the centre of the pattern is intended to be at 20 yards. The same pattern, with slightly expanded spacing could, of course be calibrated for steps of 10 metres.

It should be noted, however, that the particular type of sighting element and graphic image pattern is not central to the present invention, and the skilled person will appreciate that different types of sighting element and graphic image pattern could equivalently be used.

With reference to the description in the introduction to this specification, it should be noted that the illustrated optical arrangement has the sighting element 40, 140 at the second focal plane (SFP) 11". Although not illustrated, the invention concerning the locking zoom adjustment ring is equally applicable to the sighting element being at the first focal plane (FFP) 11'.

With the reticle placed at the SFP location 11" as illustrated, the graphic image pattern 141 of the sighting element 140 will appear as a constant size in the telescopic image 100 presented to the user while the telescopic target image 80 will grow and shrink as the telescopic control is used to vary the zoom.

In use, the telescopic sight 1, 101 with the reticle 140 of FIG. 18 may be mounted to a crossbow (not illustrated), which is then mounted in a fixed orientation at 20 yards (or metres) away from a sighting target. A grouping of bolts is then fired and then the elevation and windage manual adjustment controls 3, 4 are used to zero the sight so that the grouping falls on the aiming point on the target.

Briefly, each rotatable turret knob 5 is linked to an actuator including a linkage mechanism and a plunger which extends to the interior 90 of the housing. The linkage mechanism converts the rotational movement of the turret knob to movement of the plunger to cause a corresponding shift in the transverse orientation of the outer tube 65, 65' and the associated internal optical components 64', 64". So that a user can judge how far to turn each knob, the manual adjustment mechanism usually comprises a click-stop mechanism to quantize the rotation and hence movement of the plunger and the corresponding adjustment to the aiming point.

Then the crossbow (or the target) is moved to increase the distance to, for example, 30, 40 or 50 yards (or metres) and another grouping of bolts is fired. This time, the horizontal and vertical manual adjustment controls are not adjusted, and the zoom adjustment ring is turned as necessary until a subsequent grouping falls on the target at the aiming point indicated for that distance, as shown in FIG. 19. In this way, the aiming points are brought into correspondence with the bolt trajectory for a particular bolt firing velocity. Once this is done, the zoom adjustment ring 8, 108 is moved from the locked to the unlocked orientation, thereby fixing the sighting for that combination of crossbow and bolts.

In should be noted that to maintain a clear image, it is important that telescopic sights should be waterproof and fog-proof at least to some degree. If water or water vapour gets inside the housing interior 90 to affect the optical system 16, 17, 40, 64 housed by the housing, then liquid water or condensation can obscure the image. Quite often, the sealed interior 90 of the telescopic sight 1, 101 will be filled during manufacture and assembly with a dry and substantially inert gas, for example dry $N_2$, and then atmospherically sealed to retain the dry gas and to help prevent ingress of liquid water, water vapour, dust or dirt. The O-rings 32', 32" between zoom adjustment ring 5, 105 and housing main body 18, 118 help to maintain this seal. Additional or alternative sealing rings could, however, be provided inside the housing 2, 102.

Figure 20:
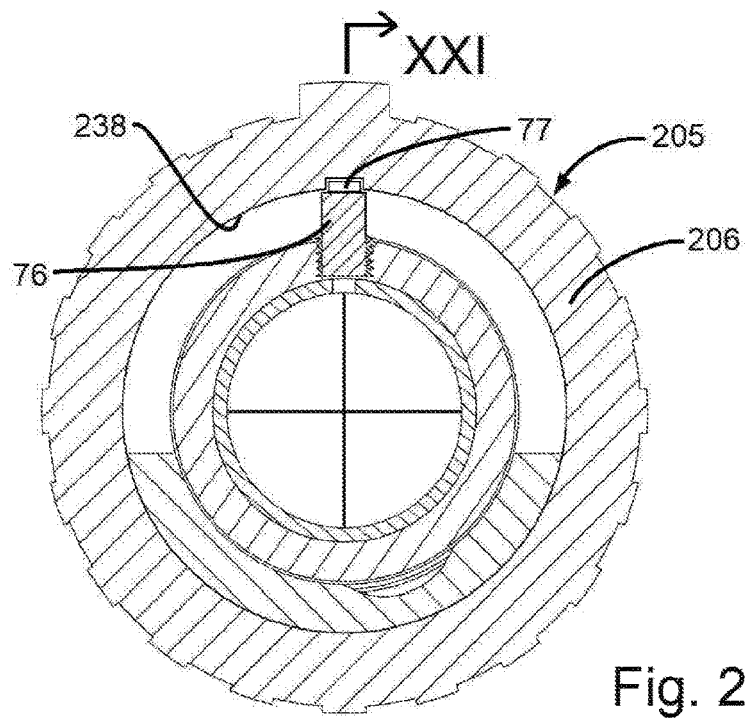
FIG. 20 is a section view of part of a manually adjustable zoom mechanism for a hand-held weapon according to a third preferred embodiment of the invention, the mechanism comprising a zoom adjustment ring for actuating internal components of an optical zoom system, the ring being linked to the system by a pin that extends outwards from an outer rotatable tube to engage within an axial slot of a main portion of the zoom adjustment ring.
Figure 21:
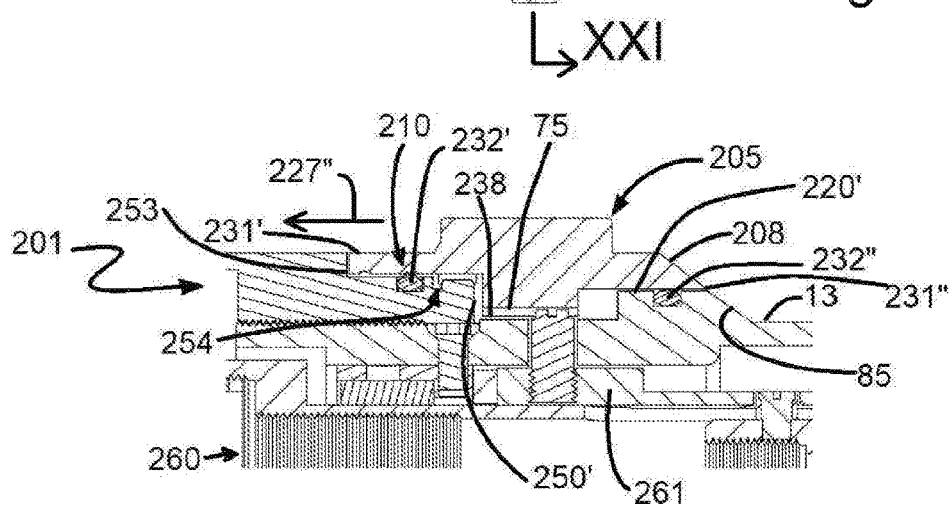
FIG. 21 is a partial cross-section through the zoom mechanism, along line XXI-XXI of FIG. 20, showing the pin engaged within a forward part of the slot, the zoom adjustment ring and housing have therebetween interengaging formations that are in a locked configuration.
Figure 22:
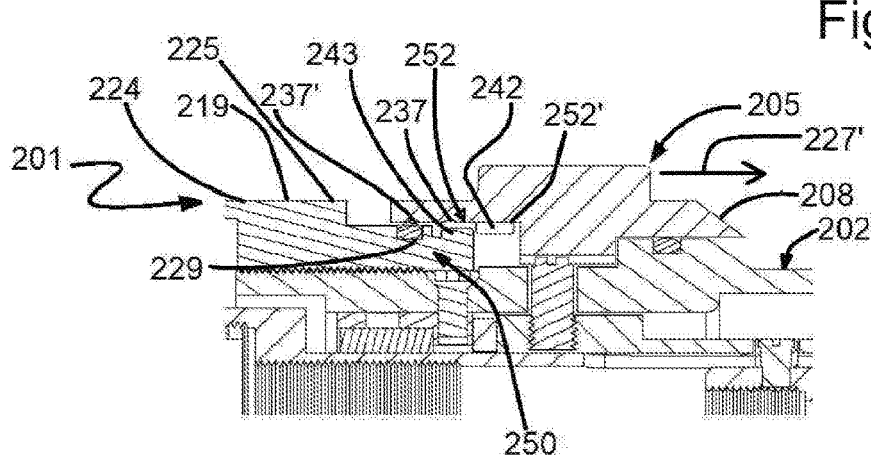
FIG. 22 is a partial cross-section similar to that of FIG. 21, but with the zoom adjustment ring slid forwards so that the pin is engaged with a rearwards part of the slot and with the interengaging formations in an unlocked configuration so that the zoom adjustment ring may be turned to adjust the zoom magnification.

FIGS. 20 to 22 show various views of part of a telescopic sight 201 comprising a manually adjustable zoom mechanism for a hand-held weapon according to a third preferred embodiment of the invention. Components or features which are the same as in the telescopic sight 1 of the first embodiment and enumerated with the same reference numbers and components or features which are similar or analogous are indicated using reference numbers incremented by 200.

The optical system of the telescopic sight is the same as described above, and so will not be illustrated and described again. The telescopic sight differs from the first two embodiments 1, 101, in the way a zoom adjustment ring 205 is linked to the optical zoom system, and in the particular form of the interengaging formations (see also FIG. 5) which are in the form of teeth or splines 242, 243. The teeth 242, 243 are located between a pair of sealing O-rings 232', 232" on which the zoom adjustment ring slides axially and rotationally. One O-ring is a rearward O-ring 232' which also engages with forward and rearward location features 237, 237' which, as in the other embodiments are circumferentially extending recesses or shallow grooves 237, 237', spaced axially apart on an inner surface 252 of the of a rearward portion 210 of the zoom adjustment ring 205.

The forwards O-ring 232" is seated in in an outer cylindrical surface 220' proximate a rearward end of the central portion 13 of the housing 202. The housing 202 forwards of the portion illustrated in the drawings is the same as the other two embodiments. The housing 202 comprises an ocular housing 219 which is the same as the other embodiments, except which this interfaces with the zoom adjustment ring. The rearwards O-ring 232' is seated in a groove 229 in an outer surface 254 of a forward portion 250 of an ocular housing 219.

In this embodiment, the outwardly facing teeth 243 are provided on a forwardmost end 250' of the forward portion 250 of the ocular housing 219, and the inwardly facing teeth 242 are provided at a forwardmost end 252' of an inner surface 252 of the rearward portion 210 of the zoom adjustment ring 205.

Forward of the inwardly facing teeth 242, the zoom adjustment ring has a substantially cylindrical inner surface 238 of reduced diameter as comparted with that of the inner surface 252 of the rearward portion 210. The cylindrical inner surface 238 has an axially extending slot or groove 75. The zoom adjustment ring 205 is linked to the optical zoom system 260 by a pin 76 that extends outwards from an outer rotatable tube 261. A head 77 of the pin is seated within the axial slot 75, which is provided by a main portion 206 of the zoom adjustment ring 205. The slot is therefore a location feature for the pin.

Because of the location of the sets of teeth at the respective forwards and rearwards ends of the opposing outwardly facing and inwardly facing surfaces, there is no need for grooves to be provided on the opposing surfaces.

The sets of teeth slide axially out of interleaved engagement to permit rotation of the zoom adjustment ring when the ring is axially moved forwardly 227' to an unlocked configuration in which the formations disengage. When the zoom adjustment ring is slid rearwardly 227" so that the sets of teeth slide into engagement with each other, an annular end face 251 at a rearward end 231' of the zoom ring comes into abutting contact with a shoulder 253 at a forwards end 225 of a cylindrical outer surface 224 of the ocular bell.

A forwards end 231" of the zoom adjustment ring has an inner radius that is greater than that of the central portion 13 of the housing 202, and so the housing has a frusto-conical surface 85 which is an extension of a forwardly directed cylindrical chamfer 208 of the zoom ring.

Although the invention has been described with particular reference to a first focal plane (FFP) telescopic sight, the invention is can also be used with second focal plane (SFP) telescopic sights. In this case, the size of the reticle image relative to the object or telescopic image is fixed, and so an unwanted shift in the zoom magnification will not cause a significant change in any aiming points across the field of view, but a change in zoom magnification will cause a change in the relative sizes of reticle markings and the telescopic image. This can be inconvenient if reticle markings become inconveniently small, or so large that these begin to cover and obscure features in the telescopic image. There is also a trade-off between zoom magnification and image brightness, and so an unexpected change in zoom setting can also cause an unwanted change in the brightness of the telescopic image. This is a particular problem when shooting in dim ambient light with a zoom magnification which is too high to give sufficient brightness in the telescopic image. The invention can therefore also provide a manually adjustable zoom mechanism for a FFP telescopic sight that can be quickly released from a locked position, altered, and then quickly locked in at the desired zoom setting.

The invention therefore provides provide a telescopic sight apparatus having a zoom mechanism for a hand-held weapon, for example a crossbow, rifle, handgun or other similar weapon, that can quickly and easily be locked and unlocked to adjust zoom magnification, for example during sighting of the telescopic sight apparatus.

It is to be recognized that various alterations, modifications, and/or additions may be introduced into the constructions and arrangements of parts described above without departing from the spirit or scope of the present invention.

The invention claimed is:

1. A telescopic sight for a hand-held weapon, comprising:
    an optical system configured to present a telescopic image to a user of the telescopic sight, said telescopic image comprising a target image and a graphic image pattern that provides to the user an aiming point in the target image, the optical system comprising an optical zoom system configured to increase and decrease a magnification of said target image;
    a housing, the optical system being housed by the housing and the housing extending around an optical axis of the optical system and extending forwards from an ocular bell of the housing towards an objective portion of the housing and comprising between said ocular bell and objective portion a housing main body; and
    a zoom adjustment ring mounted on the housing main body forwards of the ocular bell of the housing, the zoom adjustment ring comprising a main band extending around a circumference of the housing main body;
    the main band of the zoom adjustment ring is slideably mounted with respect to the housing whereby the zoom adjustment ring is configured to rotate in opposite first and second circumferential directions; and
    the main band of the zoom adjustment ring is linked to the optical zoom system to permit manual adjusting of said magnification of said target image when the zoom adjustment ring is rotated;
    wherein:
    the ocular bell comprises an outer surface and at a forward end of said outer surface a circumferentially extending shoulder that extends radially inwards from said outer surface, said ocular bell further comprising forwards of said shoulder a radially outwards facing surface of reduced outer diameter relative to that of said outer surface of the ocular bell;
    the zoom adjustment ring further comprises a rearward portion extending from the main band towards the ocular bell, the rearward portion comprising a radially inwards facing surface configured to oppose and slide axially over said radially outwards facing surface as the zoom adjustment ring is axially moved between a first axial position and a second axial position;
    the main band of the zoom adjustment ring is slideably mounted with respect to the housing whereby the zoom adjustment ring is configured to slide axially between said first and second positions;
    interengaging formations are provided on said opposing radially outwards facing surface and radially inwards facing surface, said formations sliding into engagement with each other when the zoom adjustment ring is axially moved to one of the first and second axial positions, thereby locking the ring against circumferential rotation to set the magnification of said target image, and sliding out of engagement with each other when the zoom adjustment ring is axially moved to the other of the first and second axial positions, thereby freeing the zoom adjustment ring for circumferential rotation to permit said manual adjusting of said magnification of said target image; and
    the rearward portion of the zoom adjustment ring is separated by an annular gap from said shoulder when the zoom adjustment ring is at said second axial position, said gap being closed when the zoom adjustment ring is at said first axial position.

2. A telescopic sight as claimed in claim 1, in which the optical system further comprises:
    an objective lens system;
    an ocular lens system;
    an image erector lens system between said objective and ocular lens systems;
    a sighting element bearing a graphic image pattern that is optically arranged with respect to the objective and ocular lens systems to provide the aiming point in the target image;
    a first focal plane between the image erector lens system and the objective lens system;
    and a second focal plane between the image erector lens system and the ocular lens system, the sighting element being located at the second focal plane, whereby the graphic image pattern of the sighting element has a substantially constant size in the telescopic image as the zoom adjustment ring is used to change the magnification of the target image.

3. A telescopic sight as claimed in claim 1, in which the outer surface of the ocular bell is a cylindrical outer surface and the rearward portion of the zoom adjustment ring is a cylindrical outer surface, the diameters of said cylindrical outer surfaces matching each other.

4. A telescopic sight as claimed in claim 1, in which the rearward portion of the zoom adjustment ring is a substantially cylindrical skirt that extends axially away from the main band of the zoom adjustment ring towards the shoulder of the ocular bell.

5. A telescopic sight as claimed in claim 1, in which the radially outwards facing surface of the ocular bell is provided by a sleeve that extends axially forwards from said shoulder.

6. A telescopic sight as claimed in claim 5, in which said sleeve has a cylindrical bore inside of which is fitted a rearward end of the housing main body.

7. A telescopic sight as claimed in claim 1, in which the interengaging formations are intermeshing sets of teeth, one of said sets of teeth being provided on said radially outwards facing surface and the other one of said sets of teeth being provided on said radially inwards facing surface, said sets of teeth interengaging when the zoom adjustment ring is moved to the first axial position.

8. A telescopic sight as claimed in claim 7, in which each set of teeth is composed of a series of alternating ridges and grooves, said ridges and grooves extending in said axial direction and having in section a substantially zigzag surface profile, whereby the ridges of each one of said sets of teeth interengage with the grooves of the other one of said sets when the zoom adjustment ring is moved to the locked position.

9. A telescopic sight as claimed in claim 8, in which the ridges of each one of said sets of teeth have tips that are rounded relative to the grooves of the other one of said sets of teeth with which said ridges interengage, said rounding providing clearance gaps to facilitate initial interengagement as the zoom adjustment ring is moved to the locked position.

10. A telescopic sight as claimed in claim 1, in which the telescopic sight further comprises, between said opposed radially outwards facing and inwards facing surfaces, an O-ring, said O-ring extending around the full circumference of said opposed surfaces and being axially located in a corresponding O-ring seat provided in a first one of said opposed surfaces, and being axially slideable with respect to a second one of said opposed surfaces when the zoom adjustment ring is axially moved between said first and second positions.

11. A telescopic sight as claimed in claim 10, in which the second one of said opposed surfaces comprises a first notch and/or a second notch for locating the zoom adjustment ring in, respectively, the first axial position and/or the second axial position, the configuration of said opposed surfaces and the O-ring being such that radial compression of the O-ring is relaxed when the O-ring is located with, respectively, the first notch and/or the second notch, and increased when not located in, respectively, the first notch and/or the second notch, the O-ring thereby being retained in, respectively the first notch and/or the second notch, to locate the axial position of the zoom adjustment ring in, respectively, the first axial position and/or the second axial position.

12. A telescopic sight as claimed in claim 11, in which the first notch and/or the second notch is a circumferentially extending groove in the second one of said opposed surfaces.

13. A telescopic sight as claimed in claim 10, in which the O ring contributes to an atmospheric seal of an interior of the housing.

14. A telescopic sight as claimed in claim 1, in which the second axial position of the zoom adjustment ring is relatively nearer the ocular bell of the housing than the first axial position of the zoom adjustment ring.

15. A telescopic sight as claimed in claim 1, in which the second axial position of the zoom adjustment ring is relatively nearer the objective portion of the housing than the first axial position of the zoom adjustment ring.

16. A telescopic sight as claimed in claim 1, in which the optical zoom system is linked to the zoom adjustment ring by a pin that extends radially inwards from the main band of the zoom adjustment ring, and the housing main body comprises a slot therethrough to provide passage for said pin, said slot extending in a circumferential direction of less than the full circumference of the housing to permit rotation of the zoom adjustment ring in said first and second circumferential directions, the slot having a width in said axial direction sufficient to permit movement of the pin in said axial direction as the zoom adjustment ring is moved between said first axial position and second axial position, whereby the zoom adjustment ring when in the second axial position can be rotated across a range of circumferential position to a desired circumferential position and then moved to the first axial position to lock the zoom adjustment ring against further rotation at said desired circumferential position.

17. A telescopic sight as claimed in claim 16, in which the optical zoom system comprises a pair of concentric tubes held within the housing, an outer one of said tubes being rotatable about an optical axis of the optical system and an inner tube being axially movable along the optical axis and holding at least one lens which when moved axially in a first direction increases said magnification and when moved axially in an opposite second direction decreases said magnification.

18. A telescopic sight as claimed in claim 17, in which the optical axis is substantially coincident with a rotational axis of the zoom adjustment ring.

19. A telescopic sight as claimed in claim 17, in which a linkage is provided between the inner and outer tubes which translates a rotational movement of the outer tube to axial movement of the inner tube.

20. A telescopic sight as claimed in claim 17, in which the pin is engaged with the outer tube, whereby rotation of the zoom adjustment ring is translated directly into rotation of the outer tube, said engagement of the pin and the outer tube accommodating relative axial movement between the pin and the outer tube as the zoom adjustment ring is moved between locked and unlocked positions without causing axial movement of the outer tube.

21. A telescopic sight as claimed in claim 20, in which the pin is engaged with a hole in the outer tube, the pin being substantially cylindrical and said hole being elongate in the axial direction to permit the pin to move axially in said hole relative to the outer tube as the zoom adjustment ring is moved between locked and unlocked positions without causing axial movement of the outer tube.

22. A telescopic sight as claimed in claim 16, in which the main band of the zoom adjustment ring has a radially inner surface, said surface being opposed to a radially outer surface of the housing main body, and the telescopic sight further comprises between said opposed surfaces a pair of O-rings, said pair of O-rings is spaced axially apart on opposite axial sides of said slot, each O-ring extending around the full circumference of said opposed surfaces of the main band and housing main body, each O-ring being seated in a groove in one of said opposed surfaces and the other of said opposed surfaces being slideable over said O-ring in both axial and circumferential directions as the zoom adjustment ring is moved.

23. A telescopic sight as claimed in claim 1, in which the main band of the zoom adjustment ring has a radially inner surface, said surface being opposed to a radially outer surface of the housing main body, and the telescopic sight further comprises between said opposed surfaces a pair of O-rings, said O-rings being spaced apart axially, each O-ring extending around the full circumference of said opposed surfaces of the main band and housing main body, each O-ring being seated in a groove in one of said opposed surfaces and the other of said opposed surfaces being slideable over said O-ring in both axial and circumferential directions as the zoom adjustment ring is moved.

24. A telescopic sight as claimed in claim 1, in which the interengaging formations between the ocular bell and the zoom adjustment ring on, respectively, said opposing radially outwards facing surface and radially inwards facing surface, do not extend around the full circumference of said opposing surfaces whereby there is at least one gap in said interengaging formations, and the housing and the zoom adjustment ring provide a passage for air to pass through said gap in said interengaging formations to equalise air pressure between the zoom adjustment ring and the housing as the zoom adjustment ring is moved between the first axial position and the second axial position.

\* \* \* \* \*